United States Patent [19]

Campbell et al.

[11] Patent Number: 5,918,209

[45] Date of Patent: Jun. 29, 1999

[54] METHOD AND SYSTEM FOR DETERMINING MARGINAL VALUES FOR USE IN A REVENUE MANAGEMENT SYSTEM

[75] Inventors: Gregory L. Campbell; Robert L. Phillips, both of Palo Alto, Calif.; Jon P. Zimmerman, London; Richard A. Saleh, Ealing, both of United Kingdom; Richard C. Grimes, Redwood City; Stefan L. Beskow, Mountain View, both of Calif.

[73] Assignee: Talus Solutions, Inc., Mountain View, Calif.

[21] Appl. No.: 08/585,637

[22] Filed: Jan. 11, 1996

[51] Int. Cl.⁶ .................................................. G06F 151/00
[52] U.S. Cl. .................................................. 705/5; 705/10
[58] Field of Search ................................ 705/5, 6, 7, 10, 705/20, 28, 29

[56] References Cited

U.S. PATENT DOCUMENTS 5,404,291  4/1995  Kerr et al. ............................. 364/407

OTHER PUBLICATIONS

Scandinavian Airlines System, "Origin and Destination Revenue Management System," The Innovation Network (http://innovate.si.edu), The Smithsonian.

William J. Carroll and Richard C. Grimes, Evolutionary Change in Product Management: Experiences in the Car Rental Industry, Interfaces 25:5, Sep.–Oct. 1995, pp. 84–104.

Charles Bruno, Network Responds to the Hyatt Touch; Net Risks Pay Off For Hyatt Hotels, State of Iowa, Network World, vol. 11, No. 47, Nov. 21, 1994.

Gabriel R. Bitran and Susana V. Mondschein, An Application of Yield Management to the Hotel Industry Considering Multiple Day Stays, Operations Research, vol. 43, No. 3, May–Jun. 1995, pp. 427–443.

(List continued on next page.)

*Primary Examiner*—Frantzy Poinvil
*Attorney, Agent, or Firm*—Christie, Parker & Hale, LLP

[57] ABSTRACT

A method and system for determining marginal values for perishable resources expiring at a future time, for example, an airline seat, hotel room night, rental car day or the like, for use in a perishable resource revenue management system. Data for the perishable resources and composite resources is loaded from the perishable resource revenue management system into the marginal value system. Internal data structures are constructed for linking each of the perishable resources to their associated composite resources and for linking each of the composite resources to their associated perishable resources. The marginal values for the perishable resources are determined using a continuous optimization function using interdependencies among the perishable resources and the composite resources in the internal data structures. The marginal values are stored from the marginal value system into the perishable resource revenue management system.

60 Claims, 26 Drawing Sheets

OTHER PUBLICATIONS

Robert L. Philips, A Marginal–Value Approach to Airline Origin and Destination Revenue Management, Proc. of the 16th IFIP Conf. on System Modeling and Optimization, 1994, pp. 1–7.

Robert L. Phillips, A Note on Leg Marginal Values and Bid Prices, Decision Focus Incorporated, Apr. 1994, pp. 1–4.

Renwick E. Curry, Optimal Airline Seat Allocation with Fare Classes Nested by Origins and Destinations, Transportation Science, vol. 24, No. 3, Aug. 1990, pp. 193–204.

Renwick E. Curry, Optimum Airline Seat Allocation with Fare Classes Nested by Origins and Destinations, Prepared Aug. 31, 1988 from an internal technical note of Jun. 18, 1988, pp. 1–17.

William M. Swan, Revenue Management—Myths and Methods, United Airlines, Jul. 1988.

Richard D. Wollmer, An Airline *Seat Management Model for a Single Leg Route when Lower Fare Classes Book First, Operations Research,* vol. 40, No. 1, Jan.–Feb. 1992, pp. 26–37.

Guillermo Gallego and Garrett van Ryzin, *A Multi–Product Dynamic Pricing Problem and Its Applications to Network Yield Management,* Jan. 18, 1994, pp. 1–41.

Elizabeth L. Williamson, Airline Network Seat Inventory Control: Methodolgies and Revenue Impacts, Flight Transportation Report R 92–3, Jun. 1992, pp. 1–268.

Peter P. Belobaba, Application of a Probabilistic Decision Model to Airline Seat Inventory Control, Operations Research vol. 37, No. 2, Mar.–Apr. 1989, pp. 183–196.

Peter P. Belobaba, *Origin–Destination Seat Inventory Control, TIMS/ORSA* Joint National Meeting, Oct. 27, 1987, pp. 1–11.

Subhash Gupta, Ravi Mehrotra and Sanjay Nagalia, *A Practicla Approach to Network–Based Seat Inventory Management,* Intergrated Decisions and Systems, Inc., pp. 1–4 and 2–9.

Airline Business, "Dig an Little Bit Deeper," Issued Oct. 1996, p. 64.

Harris et al., Marketing Management, V4N2, "Hold My Place, Please," Issued Fall 1995, pp. 34–44+.

Feldman, Air Transport World, V28N12, "To Rein in Those CRs's," Issued Dec. 1991, pp. 89–92.

Feldman, Air Transport World, V31N10, "Getting Serious on Pricing," Issued Oct. 1994, pp. 56–60.

FIG. 11B

FLIGHT PATH DEPARTURE DEMAND CURVE POINTS

| | PRICE | DEMAND |
|---|---|---|
| 120A { | 500 | 0.0 |
| 120B { | 490 | 1.8 |
| 120C { | 400 | 2.0 |
| 120D { | 375 | 6.5 |
| 120E { | 150 | 7.0 |
| 120F { | 148 | 12.4 |
| 120G { | 130 | 13.0 |
| 120H { | 129 | 15.7 |
| 120I { | 120 | 16.0 |
| 120J { | 108 | 19.6 |
| 120K { | 0 | 20.0 |

FIG.14B

DEMAND POINT LIST (ORD-JFK) (140)

| | | | |
|---|---|---|---|
| 141A | $365 | 2 | 1 | ← $500−70−65=$365 |
| 141B | $322 | 4 | 3 | $400−70−65=$265 |
| 141C | $265 | 5 | 4 | ← $150−70−65=$15 |
| 141D | $205 | 3 | 2 | $130−70−65=−$5 |
| 141E | $130 | 8 | 4 | $120−70−65=−$15 |
| 141F | $15 | 6 | 4 | |

SAMPLE CALCULATION

| | | | | | | |
|---|---|---|---|---|---|---|
| 151A | 0 | 0 | 0 | 0 | 0 | 365 |
| 151B | 2 | 365 | 1 | 365 | 3 | 322 |
| 151C | 6 | 2018 | 4 | 336 | 7 | 265 |
| 151D | 11 | 3343 | 8 | 304 | 13 | 205 |

152 153 154 155 156 157

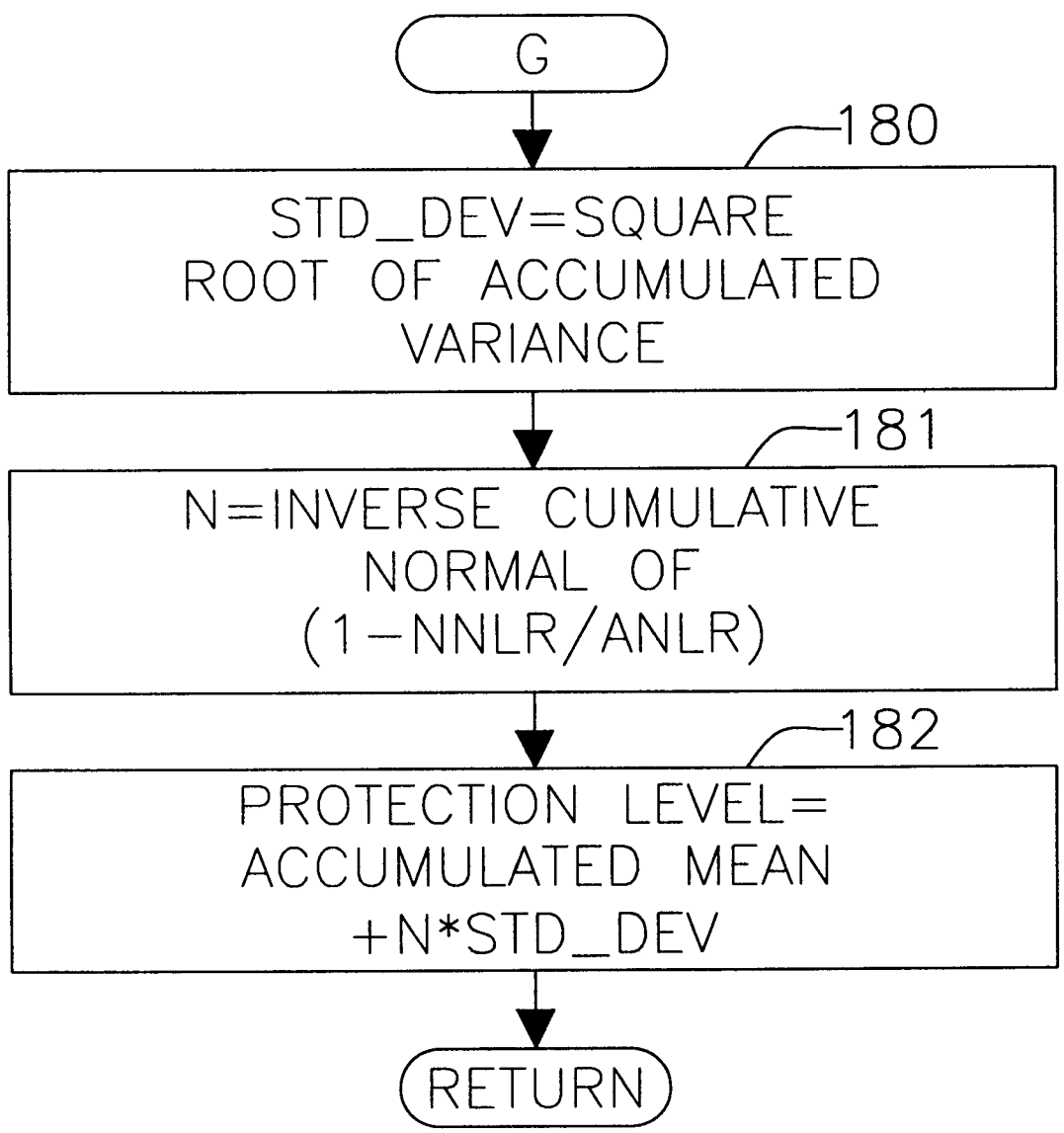

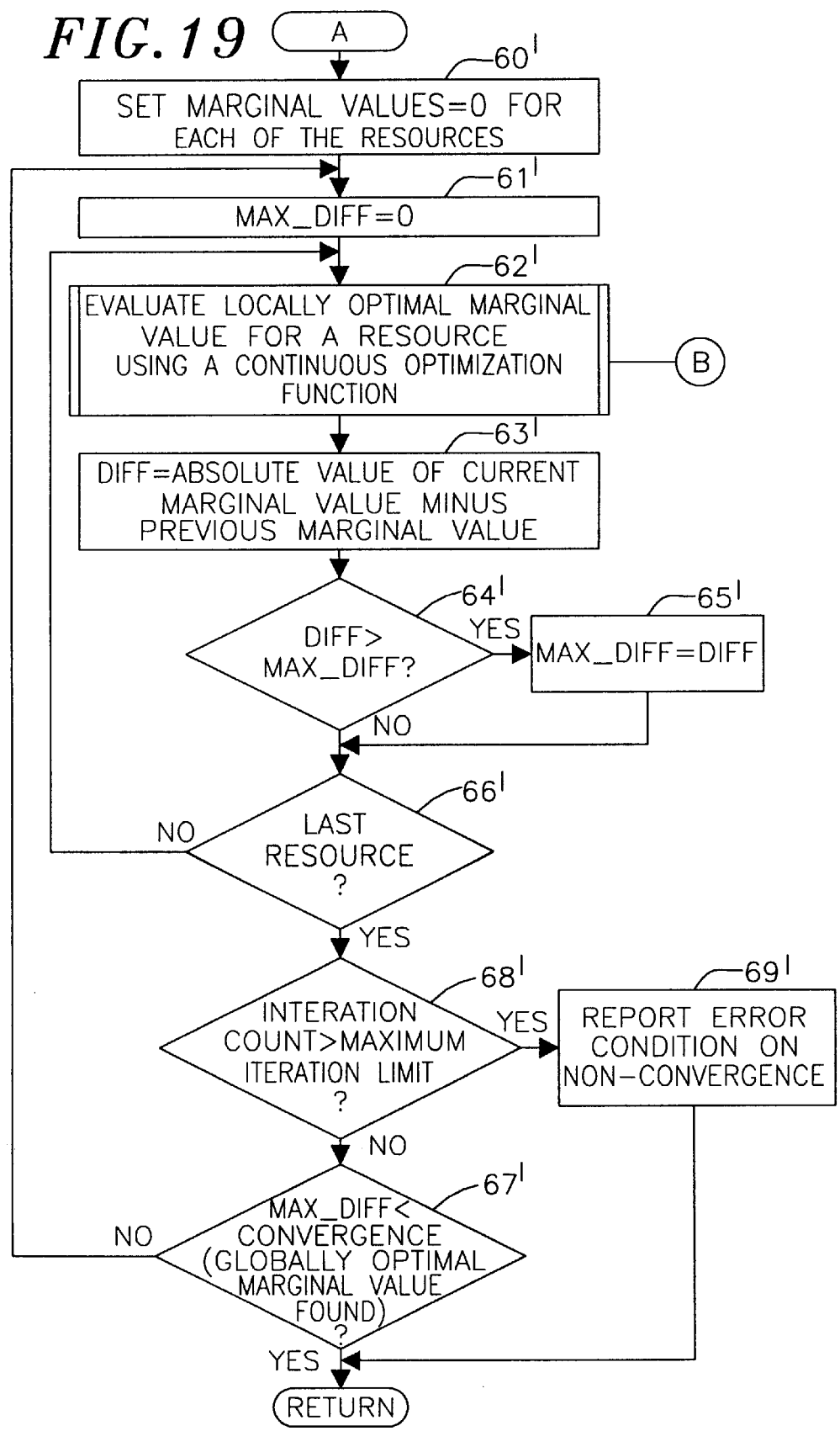

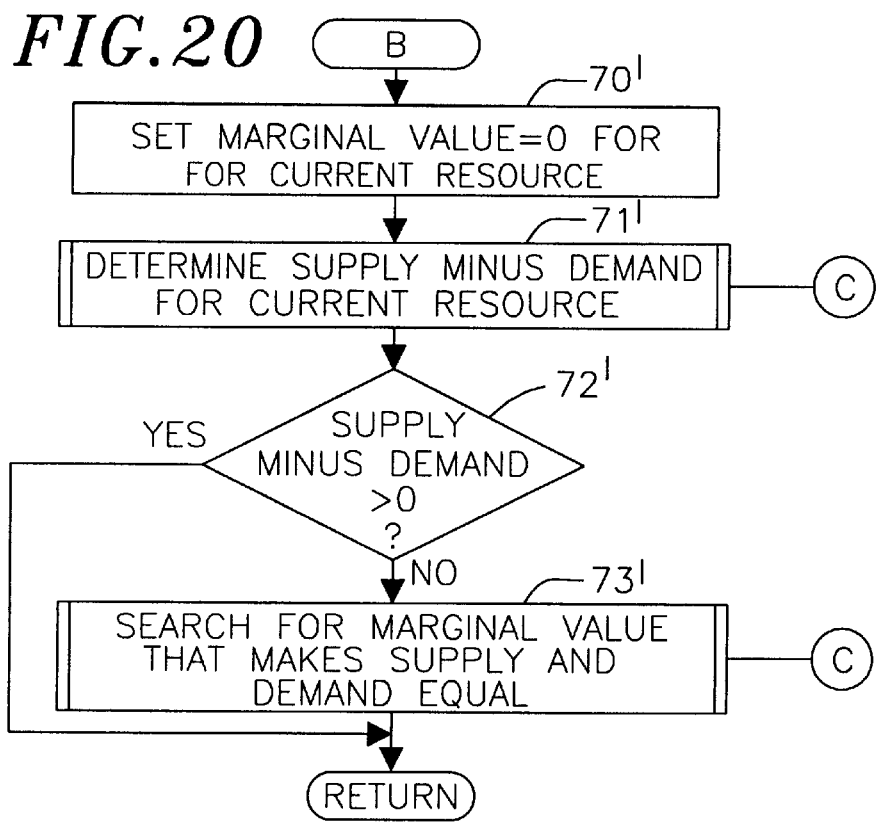
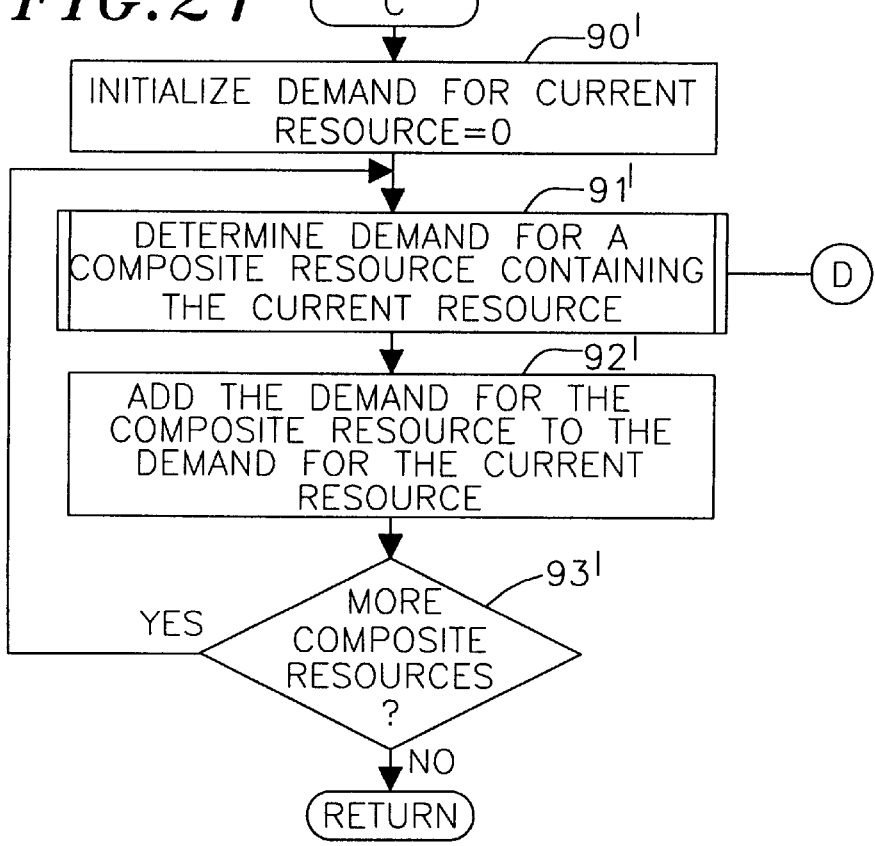

METHOD AND SYSTEM FOR DETERMINING MARGINAL VALUES FOR USE IN A REVENUE MANAGEMENT SYSTEM

FIELD OF THE INVENTION

The present invention relates to a method and system for determining marginal values for use in a revenue management system and, in particular, to a method and system for determining marginal values for use in conjunction with an airline reservations system for controlling booking of seats on flight leg departures.

BACKGROUND OF THE INVENTION

Marginal values (or bid prices) are widely used in revenue management practice as an aid to guiding the setting of prices at which to sell or commit perishable resources. For instance, in the airline industry, marginal values can be used by an airline reservations system for granting or denying the sale of seats on one or more flight leg departures.

Each marginal value represents the minimum price that should be accepted by a merchant to sell or commit an additional perishable resource based on a goal of maximizing profitability in the face of possibly uncertain demand. For a combination of perishable resources, the sum of individual marginal values represents the minimum acceptable price for the perishable resource combination.

Perishable resources by definition are ones that cannot be inventoried and share three common characteristics: perishability, "fixed" capacity and segmentability. Perishability means that each resource ages or becomes unavailable, and thus has no value, after a certain date, time or similar temporal event. "Fixed" capacity implies a high cost of adding an incremental unit such that capacity is regarded as static and unchanging. Segmentability refers to the ability to segment customers based on a willingness to pay using different rates and/or different purchase restrictions, such as the date of purchase relative to the date of use. Examples of perishable resources include airline seats, hotel room nights, rental car days and similar products or services such as described in L. R. Weatherford & S. E. Bodily, *A Taxonomy and Research Overview of Perishable-Asset Revenue Management: Yield Management, Overbooking, and Pricing*, 40 Operations Research 5, pp. 831–44 (1992), the disclosure of which is incorporated herein by reference.

One problem faced in the determination of marginal values is processing time. In the airline industry, a single airline might fly possibly thousands of flight legs (a part of a flight consisting of a single take off and landing) each day. Each flight leg requires a marginal value which is itself dependent on the particular capacity of the airplane used and the known or expected demand for that flight leg as determined by the demand for all sequences of flight legs that carry passengers from their point of origin to their point of destination. The system described herein can calculate marginal values for one departure day for a large airline in less than 15 minutes. However, prior art systems which account for these factors are constructed to calculate marginal values for all future departure days at one time, that is, during a single processing run, and require substantially more than a day (and usually three days) of calculation time.

Another problem faced is determining whether the system has converged on a final solution. Prior art systems generally determine marginal values using an iterative process whereby candidate marginal values are refined during each successive iteration until a satisfactory set of values is obtained. One prior art approach places an arbitrary limit on the number of iterations performed. This limit is used to cut down on the processing time required and to avoid problems with the system oscillating between candidate solution sets. There is no assurance that the final "solution" has actually converged. Moreover, if the limit is set too high, the processing time required becomes unnecessarily long. Conversely, if the limit is set too low, the resulting set of marginal values might be far from those that generate the maximum net revenue of the entire network.

Yet another problem faced is how to treat dependencies between individual perishable resources. In the airline industry, a combination of flight legs (known as a flight path), such as occurs whenever a passenger books a series of connecting flight legs, creates a dependency between each individual flight leg in the flight path, yet prior art systems generally overlook the effect that the flight path as a whole has on the individual marginal values. Experience with revenue management systems that take into account the passenger's flight path indicate that there is substantial value in doing so, on the order of 1% to 2% of revenue compared with conventional leg-based systems.

One further complication that has been recognized by the airline industry, yet can be found in similar industries, is that of determining marginal values for flight leg departures in a multi-dimensional problem space. Prior art hotel industry approaches were merely concerned with a one-dimensional mapping of room nights based on each guest's length of stay. In the airline industry, though, marginal values must be determined with a two-dimensional mapping of seats based on individual flight legs being associated with one or more flight paths and individual flight paths being associated with one or more flight legs.

Therefore, there is a need for a method and system for determining optimal, system-wide net revenue maximizing marginal values for perishable resources, such as seats on flight leg departures, that does not require substantial processing time yet utilizes a convergence criteria for dynamically determining whether a substantially optimal set of marginal values has been obtained. Desirably, such a method and system must also factor in dependencies between individual perishable resources, including the mapping of the determination in a multi-dimensional problem space.

SUMMARY OF THE INVENTION

Accordingly, the present invention enables the above problems to substantially be overcome by providing a method and system for determining marginal values for use in a revenue management system and a method and class library for adaptively determining client-specific marginal values in a generic problem space applicable to other industries, including hotels, rental car companies and other industries offering perishable resources.

An embodiment of the present invention is a method and system using a marginal value system for determining marginal values for perishable resources expiring at a future time, for example, an airline seat, hotel room night, rental car day or the like. Data for the perishable resources and composite resources is loaded from a perishable resource revenue management system into the marginal value system. Internal data structures are constructed for linking each of the perishable resources to their associated composite resources and for linking each of the composite resources to their associated perishable resources. The marginal values for the perishable resources are determined using a continuous optimization function using interdependencies among the perishable resources and the composite resources in the internal data structures. The marginal values are stored from the marginal value system into the perishable resource revenue management system.

A further embodiment of the present invention is a perishable resource revenue management system for granting and denying a sale of one or more perishable resources expiring at a future time depending on marginal values for each of such perishable resources received from a perishable resource revenue management system. The marginal values are determined by the steps of loading data for the perishable resources, composite resources and perishable resource values from a perishable resource revenue management system into a marginal value system; constructing internal data structures for the perishable resources, composite resources and perishable resource values; and determining marginal values for the perishable resources using a continuous optimization function; and storing the marginal values from the marginal value system into the perishable resource revenue management system.

A further embodiment of the present invention is a method using a computer and a marginal value system for determining marginal values for perishable resources expiring at a future time. A locally optimal marginal value is evaluated for one of the perishable resources using a continuous optimization function dependent on the marginal values for the other perishable resources. The locally optimal marginal value is iteratively reevaluated until a globally optimal marginal value is attained.

A further embodiment of the present invention is a method and a marginal value system for determining marginal values for seats on flight legs departing on a future date. Data for flight leg departures and flight path departures is loaded from an airline revenue management system into the marginal value system. Internal data structures are constructed for linking each of the flight leg departures to their associated flight path departures and for linking each of the flight path departures to their associated flight leg departures. The marginal values for seats on the flight leg departures are determined using a continuous optimization function using interdependencies among the flight leg departures and the flight path departures in the internal data structures. The marginal values are stored from the marginal value system into the airline revenue management system.

A further embodiment of the present invention is a method using a computer and a marginal value system for determining marginal values for seats on flight legs departing on a future date. A locally optimal marginal value is evaluated for a seat on one of the flight leg departures using a continuous optimization function dependent on the marginal values for a seat on the other flight leg departures. The locally optimal marginal value is iteratively reevaluated until a globally optimal marginal value is attained.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIG. 11B is a table showing, by way of example, the results of a demand curve construction;

FIG. 14B is a data structure used by the EMSR optimization function of FIG. 12;

FIG. 14C is a table showing, by way of example, the calculation of protection levels;

FIG. 15 is a flow diagram of a protection level determination function;

FIG. 19 is a flow diagram of an iterative function for determining generic marginal values for perishable resources;

FIG. 20 is a flow diagram of a supply-demand optimization function used by the function of FIG. 19;

FIG. 21 is a flow diagram of a resource demand determination function;

DETAILED DESCRIPTION

I. Glossary of Terms

"Flight" refers to a sequence of regularly scheduled aircraft take offs and landings designated by a flight number. A flight begins at an origin airport, can make one or more stops and terminates at a destination airport.

"Flight leg" refers to one part of a flight consisting of a single take off and landing.

"Flight leg departure" refers to a flight leg flown on a specific date (called the departure date).

"Flight Path" or "itinerary" refers to one or more connecting flight legs flown by an individual passenger from an origin airport to a destination airport.

"Flight path departure" refers to a flight path flown on the departure date.

"Airline network" refers to the collection of flight legs flown by an airline.

"Booking class" refers to a code used in reserving or booking a seat on a flight leg departure and is related to a ticket's price and conditions of purchase.

"Demand forecast" represents a prediction of the number of seats that passengers will request to book for a future flight path departure specified by statistical parameters, such as mean and variance. It also can include forecasts of cancellations and no-shows.

"Passenger value" represents what an airline receives for a passenger flying on a given flight path minus any associated direct costs, such as taxes, commissions and carrying costs, for example, the meal served and the additional fuel needed to carry that passenger.

"Resource" or "perishable resource" refers to a single unit of product or service that a merchant can sell or commit for sale. A flight leg departure is an example of a resource.

"Composite resource" refers to a collection of resources that a customer typically will purchase as a bundle at a single price. For example, a flight path departure is a composite resource made up of flight leg departures which are the resources.

II. Overview

A. Airline Network Topology

Figure 1:
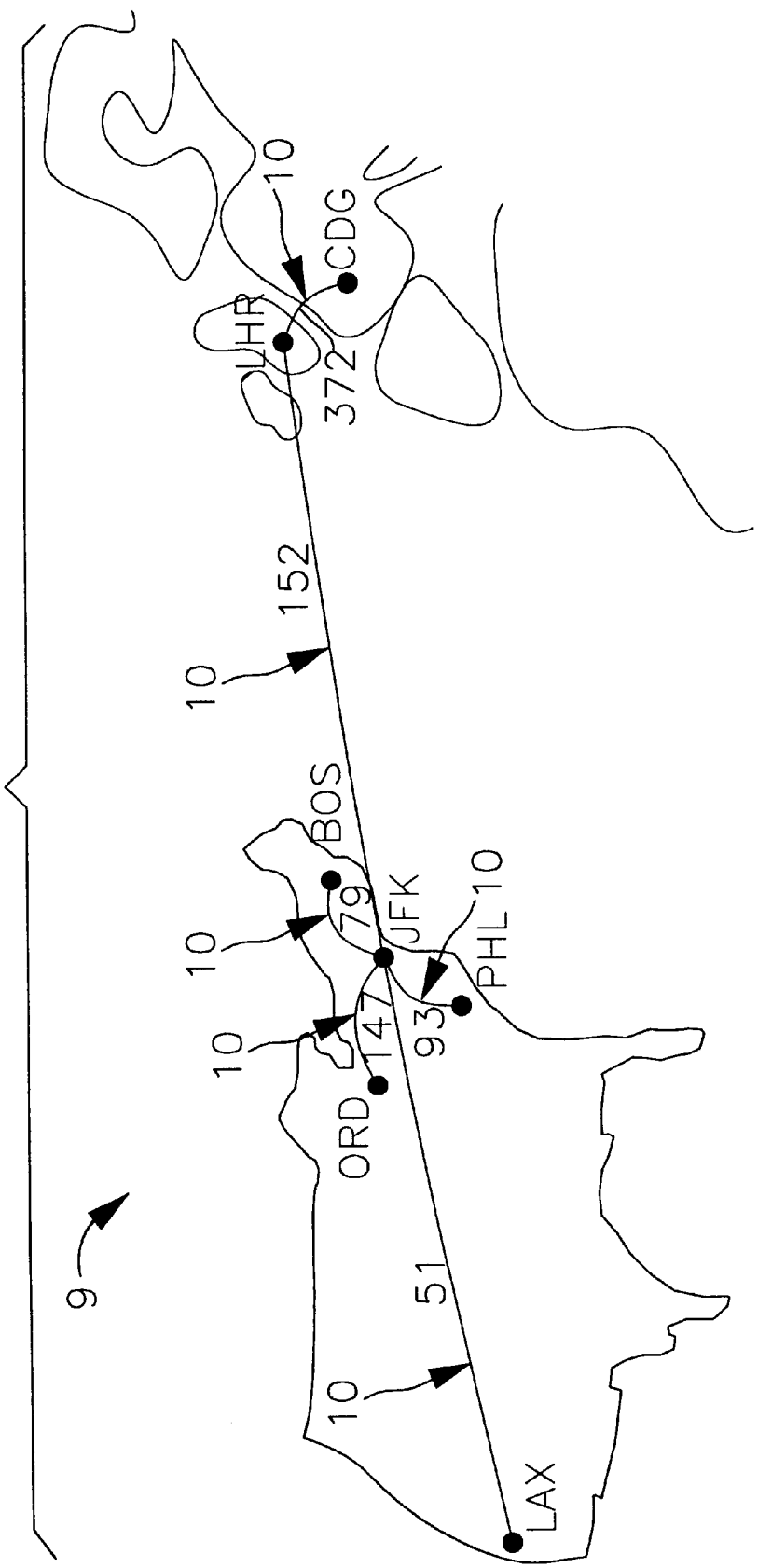
FIG. 1 is, by way of example, an outline map of the topology for an airline network.

FIG. 1 shows, by way of example, an outline map of the topology for a simple airline network 9. The airline network 9 comprises a plurality of airports as exemplified below in Table I. Each of the airports is interconnected to at least one other airport by one or more flight legs 10. The airline network 9 is configured with a single hub located at JFK. A representative flight number of each flight leg 10 is labeled on the line connecting each pair of airports. For instance, the flight leg 10 originating at LAX and terminating at JFK is flight 51.

TABLE I

| Code | Description |
| --- | --- |
| LAX | Los Angeles International Airport (Los Angeles, CA) |
| ORD | O'Hare International Airport (Chicago, IL) |
| BOS | Logan International Airport (Boston, MA) |

TABLE I-continued

| Code | Description |
| --- | --- |
| JFK | John F. Kennedy International Airport (New York, NY) |
| PHL | Philadelphia International Airport (Philadelphia, PA) |
| LHR | London Heathrow Airport (London, U.K.) |
| CDG | Charles de Gaulle Airport (Paris, France) |

B. Airline Reservations Booking System

Figure 2A:
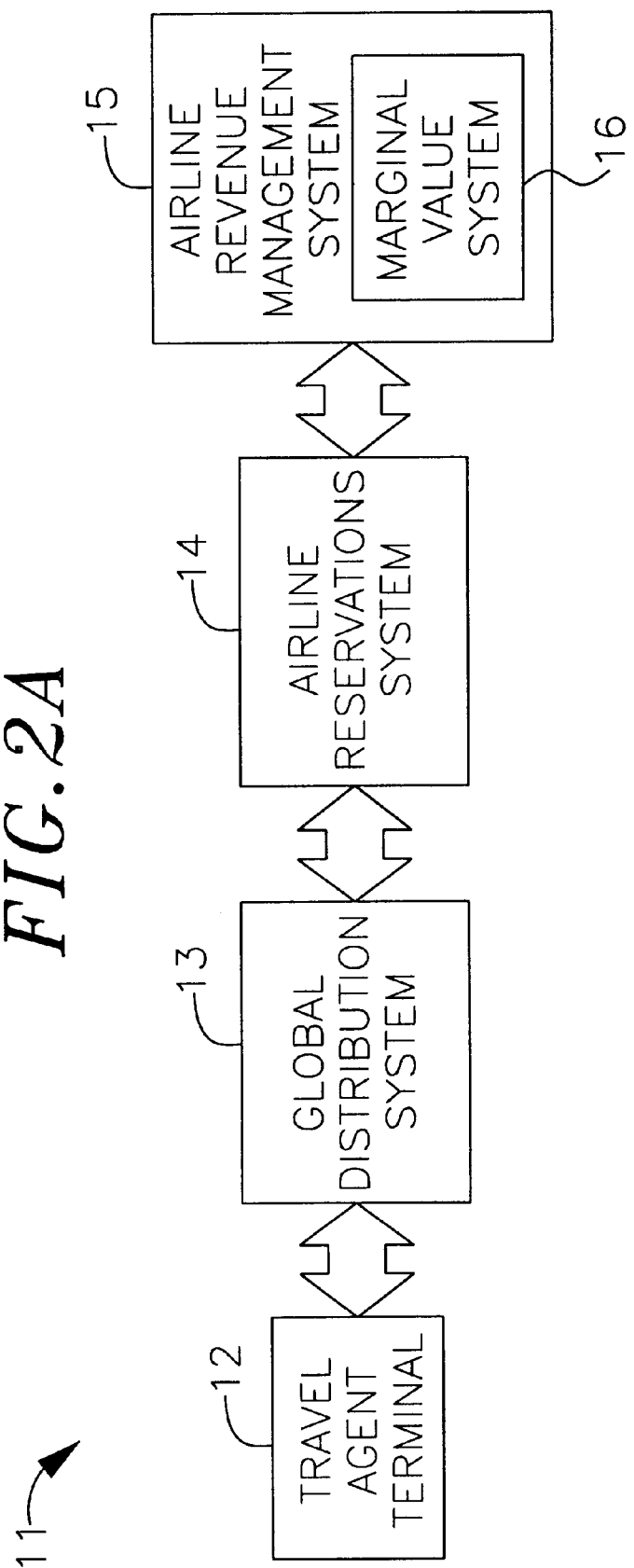
FIG. 2A is a functional block diagram of an airline reservations booking system.

FIG. 2A is a functional block diagram of an airline reservations booking system 11, used, by way of example, for granting or denying the booking of seats on flight leg departures based on marginal values. The booking system 11 comprises five components: a travel agent terminal 12, a global distribution system (GDS) 13, an airline reservations system 14, an airline revenue management system 15 and a marginal value system (MVS) 16. Although only one of each type of component is shown, a typical airline reservations booking system 11 would comprise multiple travel agent terminals 12, GDSs 13, airline reservations systems 14, airline revenue management systems 15 and marginal value systems 16.

Each GDS 13, airline reservations system 14, airline revenue management system 15 and marginal value system 16 can be embodied as a general purpose programmed computer system (not shown) that operates on a set of instructions in the form of a computer program. Such a general purpose programmed computer system contains a central processing unit, volatile memory, secondary storage and other components conventional in the art, including a cathode ray tube (CRT) or other type of display and a keyboard entry device.

Each travel agent terminal 12 is a typical computer terminal, including a cathode ray tube (CRT) or other type of display and a keyboard entry device (not shown) and is used by travel agents for remotely accessing the GDS 13 over dedicated data lines. In FIG. 2A, only one travel agent terminal 12 is shown, although there can be a multiplicity of these terminals connected to the GDS 13.

The travel agent terminal 12 is used for submitting availability and seat booking requests to the GDS 13 and for receiving data in reply from the GDS 13. An availability request queries whether a seat is available to take a passenger from an origin airport to a final destination airport over possibly different flight paths flown by possibly multiple airlines. A seat booking request specifically asks for a seat reservation. There are multiple airline reservations systems 14 associated with the GDS 13. To determine the availability of seats on the flight legs 10 flown by each airline, the GDS 13 sends availability and booking requests to each airline reservations system 14 involved in the travel agent's request. Information about the flight leg departures 10 in the airline network 9 (shown in FIG. 1) is managed and stored in the airline reservations system 14.

A response to an availability request is presented as a series of coded booking classes paired with an availability indicator. As is conventional in the art, a series of eight booking classes are used, although the exact number and combination is arbitrary and could vary according to the application. An example of a response is "F5C8Y9B9M5H4Q2V0," where each alpha and numeric character pair indicates a class of service and the approximate number of seats available. For instance, "Y9" indicates that there are 9 or more seats available on the particular flight path departure for "Y" class, "M5" indicates that there are 5 seats available for "M" class and "V0" indicates that no seats are available for "V" class. The travel agent uses a booking class to submit a booking request to the airline reservations system 14 through the GDS 13.

The GDSs 13 and the airline reservations systems 14 are shown as separate blocks in FIG. 2A, although in practice these systems are sometimes operated on the same computer. The airline reservations system 14 can also perform many of the functions of the GDS 13, although it focuses on the services of a single airline. Participation by an airline in the GDS 13 is optional, although most airlines participate in most of the major GDSs in the world. In the United States, examples of GDSs 13 are SABRE, APOLLO, WORLDSPAN and SYSTEM ONE. In Europe, two consortium GDSs 13 include AMADEUS and GALILEO.

The airline reservations system 14 accepts or denies the booking requests that it receives from the GDS 13 or a locally-connected terminal (not shown) based on various factors, including marginal values received from the airline revenue management system 15. Generally, the airline revenue management system 15 is also owned by an individual airline and operates on a separate computer from the airline reservations system 14. Its purpose is to calculate the seat availability according to booking class and corresponding to customer origin and destination and departure date and to process booking requests using stored marginal values.

Part of the airline revenue management system 15 is the marginal value system (MVS) 16. In the described embodiment, the MVS 16 is a computer program written in the C++ programming language that is executed by the airline revenue management system 15, although other programming languages are feasible. It is also envisioned that the MVS 16 can be a special purpose computer formed on an integrated circuit chip (or set of chips) or executable computer code burned into a read-only memory (ROM) chip that can be read in by conventional means or as microcode. An exemplary example of a marginal value system 16 is the marginal value system product licensed under the trademark of Marginal Value Engine™ manufactured by Decision Focus Incorporated, Mountain View, Calif. Marginal Value Engine™ and MVE™ are trademarks owned by Decision Focus Incorporated.

The purpose of the MVS 16 is to determine system-wide optimal marginal values for use by the airline revenue management system 15. The MVS 16 periodically receives a demand forecast, passenger value and the supply of seats remaining to be booked for selected future flight leg departures as inputs from the airline revenue management system 15. This same data could also be retrieved from a storage device (not shown) commonly accessible by both the airline revenue management system 15 and the marginal value system 16. A demand forecast predicts the number of bookings that will be or is expected to be made between now and the departure date expressed in terms of statistical parameters, such as mean and variance. The passenger value is a function of the booking class, point of sale and the flight path based on origin and destination. The supply of seats remaining to be booked is calculated from the capacity of the airplane assigned to the flight leg departure minus the seats already booked plus an overbooking factor to account for cancellations and no-shows. The number of flight leg departures that can be solved at one time is limited only by the computer memory available. A very large airline network 9 can be solved on a large computer.

In response, the MVS 16 sends substantially optimal marginal values for the flight leg departures selected to the airline revenue management system 15 for immediate use or storage or stores them directly into the commonly accessible storage device (not shown).

In the described embodiment, the MVS 16 is a computer program written in the C++ object-oriented programming language. It is preferably structured as a class library as further described hereinbelow. However, any suitable programming language can be employed and the MVS 16 can be embodied on any suitable computer system configuration.

B. Method for Using Marginal Values

Figure 2B:
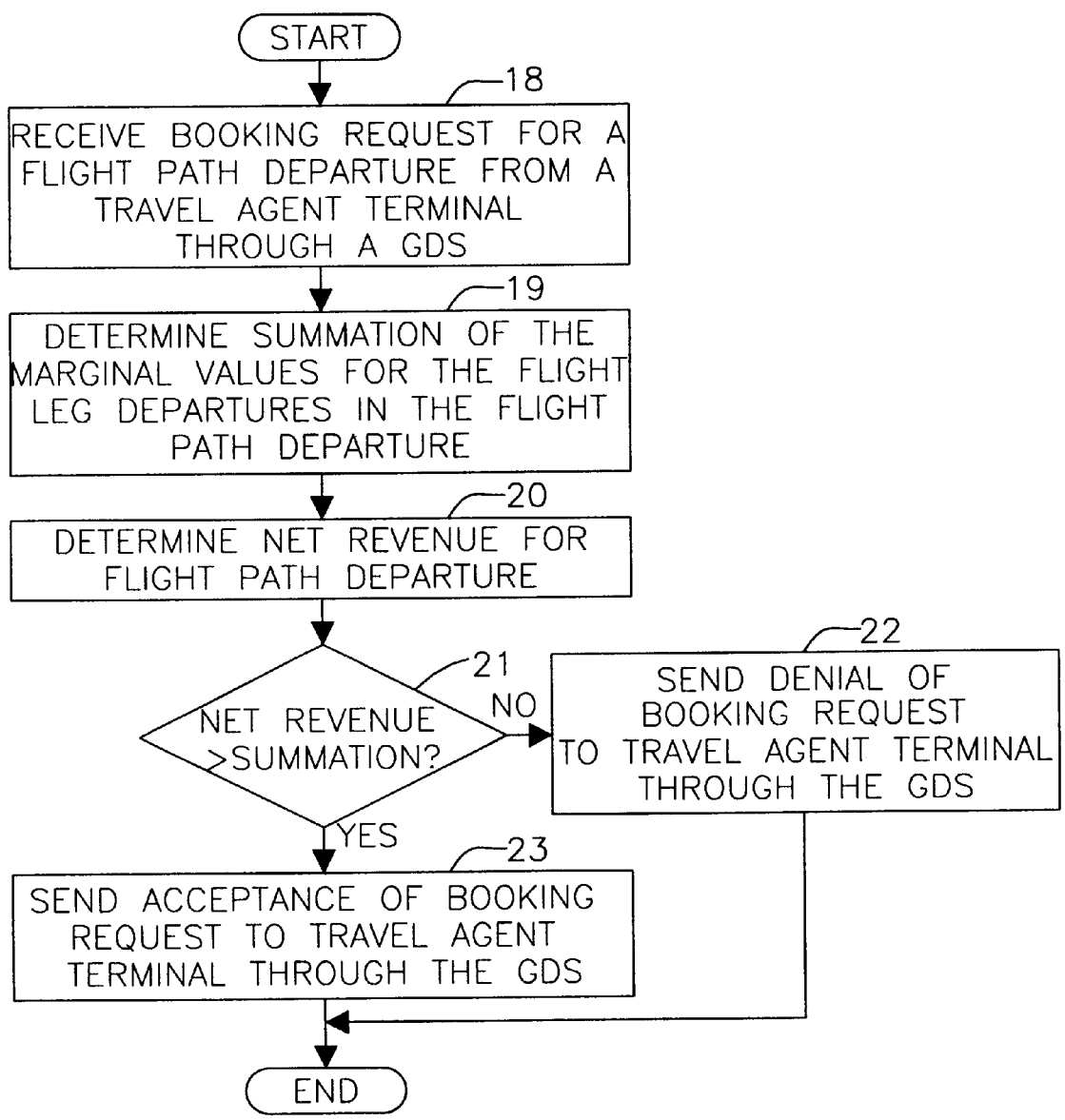
FIG. 2B is a flow diagram of a method for using marginal values in the airline reservations booking system of FIG. 2A.

FIG. 2B is a flow diagram of a method for using marginal values in the airline reservations system 14 of FIG. 2A. Marginal values determined by the MVS 16 are used by the airline reservations system 14 in granting or denying the sale of seats on one or more of the flight legs 10 departing on some future date. It is feasible that the marginal values determined by the MVS 16 could be used in different ways than described herein by airline reservations systems 14 and airline revenue management systems 15. Moreover, it is feasible that the event triggering the use of marginal values is a time, week, month, year or other future temporal event instead of or in addition to a date.

A booking request is received by the airline reservations system 14 for a flight path departure from the travel agent terminal 12 through the GDS 13 (block 18). The airline reservations system 14 determines a summation of the marginal values for the flight leg departures contained in the flight path departure (block 19) to establish a total marginal value for the origin-to-destination flight path departure. The airline reservations system also determines the net revenue for the same flight path departure (block 20). The summation of the marginal values is compared to the net revenue and if the net revenue exceeds the summation of the marginal values for the flight path departure (block 21), an acceptance of the booking request is sent to the travel agent terminal 12 through the GDS 13 (block 23). Otherwise, if the net revenue is less than the summation of the marginal values (block 21), it is not profitable to accept the booking request and a denial of the booking request is sent to the travel agent terminal 12 through the GDS 13 (block 22).

III. Airline-Specific Marginal Value Determination Method

A. Data Structures

Figure 3:
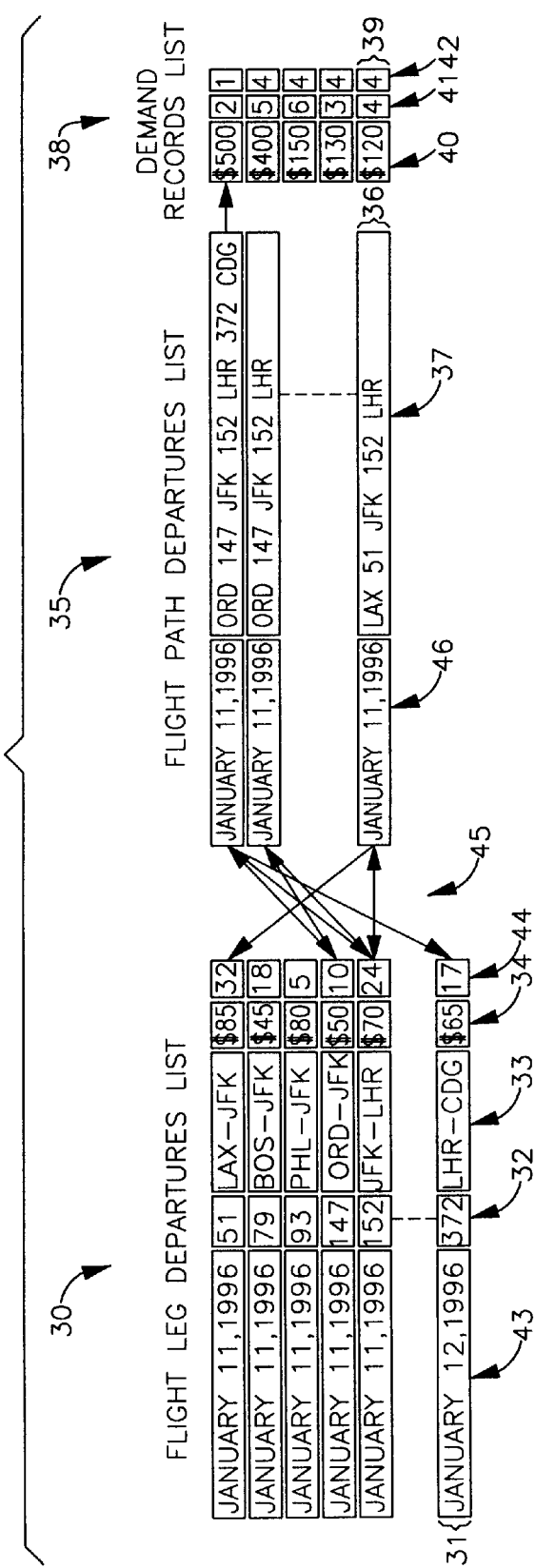
FIG. 3 shows data structures used by the marginal value system of FIG. 2A.

FIG. 3 shows the data structures used by the marginal value system 16. Three major data structures are used: a flight leg departures list 30, a flight path departures list 35 and a demand records list 38.

The data structure for the flight leg departures list 30 comprises flight leg departure records 31 containing fields for storing a departure date 43, flight number 32, origin and destination airports 33, marginal value 34 and supply of seats 44. The data structure for the flight path departures list 35 comprises flight path departure records 36 containing fields for storing a departure date 46 and a flight path definition 37. The data structure for the demand records list 38 comprises demand records 39 containing fields for storing a booking class price 40, mean 41 and variance 42. In the described embodiment, a departure date 43 is specified, although a departure time or other future temporal event is feasible.

Each flight in the airline network 9 is divided into its respective flight legs and the corresponding flight leg departures 10 are stored in the flight leg departures list 30. The flight number 32 field links each flight leg departure record 31 to its respective flight in the airline network 9. The origin and destination 33 field indicates the part of the flight to which the flight leg 10 corresponds. The departure date 43, marginal value 34 and supply of seats 44 fields store the departure date, marginal value and seat supply for the flight leg departure 10. For convenience, the flight leg departure records 31 will be referenced whenever a flight leg departure is referred to hereinbelow.

The data structure for the flight path departures list 35 stores the actual or forecasted flight path departures through the airline network 9. The departure date field 46 stores the departure date of the first flight leg 10 contained in the flight path departure. The flight path definition 37 field defines the flight path departure in terms of origin, intermediate and destination airports with the connecting flight number indicated between each of the airports. For convenience, the flight path departure records 36 will be referenced whenever a flight path departure is referred to hereinbelow.

A set of pointers 45 interconnect the flight leg departures list 30 and the flight path departures list 35 to form a two-dimensional mapping of interdependencies between the two data structures. Each flight leg departure record 31 has a list of pointers 45 pointing to all flight path departure records 36 containing the flight leg departure 10 stored in the flight path definition field 37 of the flight path departure record 36. Similarly, each flight path departure record 36 has a list of pointers 45 pointing to all flight leg departure records 31 containing the flight leg departure 10 stored in the flight path definition field 37 of each flight path departure record 36. For simplicity, the data structures for these pointer lists are not shown in FIG. 3.

The data structure for the demand records list 38 stores the different fares and statistical parameters from the demand forecast for the corresponding flight path departure. The fares are stored in the booking class price 40 field in decreasing order. Two statistical parameters, mean and variance, are stored in the mean 41 and variance 42 fields, although further statistical parameters are feasible. Each flight path record 36 points to one demand records list 38 which contains as many demand records 39 for as many fares as required. For convenience, the booking class price 40 field will be referenced whenever a particular booking class price is referred to hereinbelow.

B. Method for Determining Marginal Values

In the described embodiment, different optimization functions can be employed in determining marginal values for seats on the flight leg departures based on assumptions that the demand is either deterministic or non-deterministic. It is critical that the optimization function employed generate a continuous demand curve, preferably as a function of marginal value (expressed in dollars) and supply (expressed in seats on the flight leg departure). Two optimization functions, a supply-demand balance and an expected marginal seat revenue (EMSR), are described herein; however, other optimization functions are feasible depending upon the characteristics of the particular embodiment, such as booking patterns, marginal value updating frequency and events that trigger reoptimization.

Figure 4:
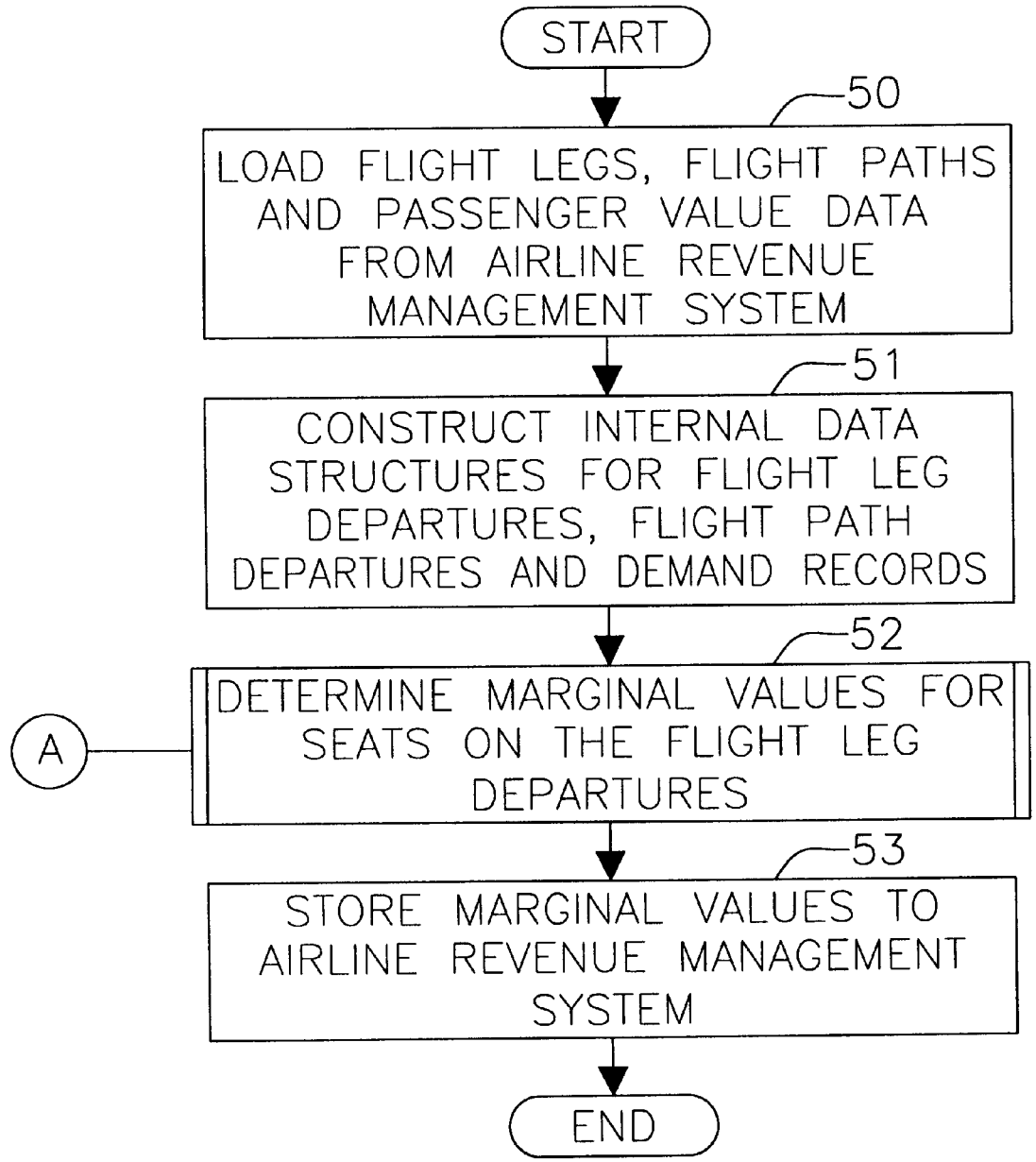
FIG. 4 is a flow diagram of a method for determining marginal values for use in the airline reservations system of FIG. 2A.
Figure 5:
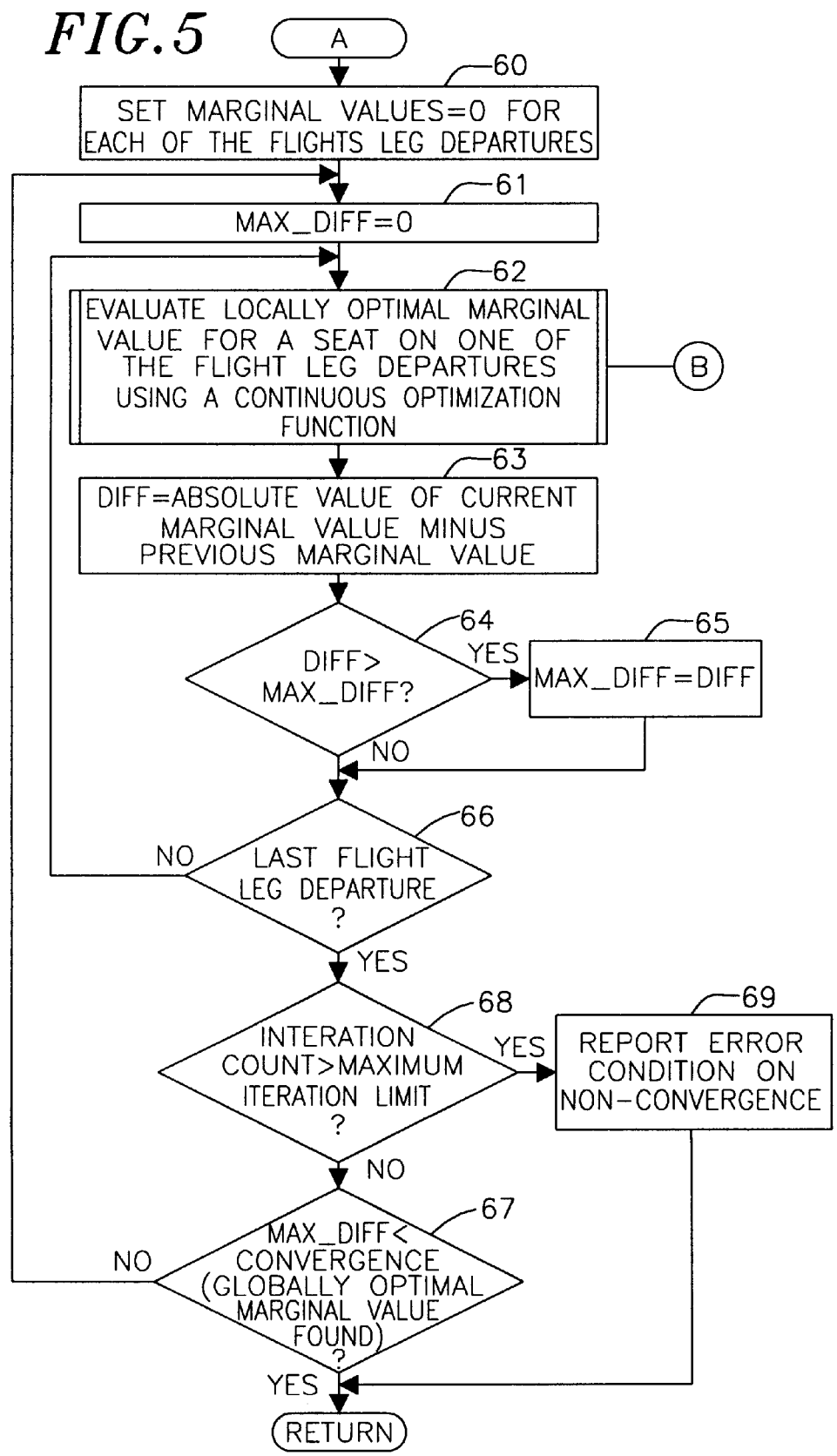
FIG. 5 is a flow diagram of an iterative function for determining marginal values for flight leg departures.

The basic control structure used to iteratively determine marginal values is identical regardless of the optimization function employed. This generic control structure is shown in FIGS. 4 and 5. A supply-demand balance optimization function is depicted in FIGS. 6 through 11B. An EMSR optimization function is depicted in FIGS. 12 through 15. The iterative section common to both optimization functions will now be described.

FIG. 4 is a flow diagram of a method using the MVS 16 for determining marginal values for use in the airline reservations system 14 of FIG. 2A. Information regarding flight leg departures, flight path departures and passenger value data are loaded into the MVS 16 from the airline revenue management system 15 (block 50). The internal data structures shown in FIG. 3, including the flight leg departures list 30, the flight path departures list 35 and the demand records list 38, are constructed for storing the received information (block 51). Marginal values 34 for each of the seats on the flight leg departures 31 are determined using an iterative function (block 52) as further described hereinbelow in FIG. 5. Upon completion of the iterative function, the marginal values are stored back to the airline revenue management system 15 (block 53).

FIG. 5 is a flow diagram of an iterative function (block 52) for determining marginal values 34 for the flight leg departures 31 as stored (block 51) in the data structures of FIG. 3. This function is structured as a pair of nested control loops that sequentially determine a marginal value 34 for each flight leg departure 31 using a Gauss-Seidel iterative approach. The flight leg departures 31 and the flight path departures 36 are interdependent upon each other for purposes of marginal value determination. The outer control loop (blocks 61–67) repeats the determination of marginal values 34 for all of the flight leg departures 31 until a convergence criterion is satisfied. In the described embodiment, convergence is generally attained in as few as 3–4 iterations, but almost always in fewer than 10 iterations resulting in a substantial decrease in processing time over the prior art. The inner control loop (blocks 62–66) sequentially determines a marginal value 34 for each of the flight leg departures 31.

The marginal value 34 for each of the flight leg departures 31 is initialized to 0 (block 60). A local variable max_diff is set to 0 (block 61). This variable stores the largest difference between current versus previous marginal value 34 out of all marginal values 34 determined during the current iteration of the outer control loop (blocks 61–67) and is used to determine convergence. A locally optimal marginal value 34 is evaluated for a seat on one of the flight leg departures 31 using a continuous optimization function (block 62). In the described embodiment, two continuous optimization functions, supply-demand balance and EMSR, are used as further described hereinbelow in FIGS. 6–11 and FIGS. 12–15, respectively.

The continuous optimization function returns a marginal value 34 for a seat on the current flight leg departure 31. The magnitude of change in the locally optimal marginal value 34 (obtained in block 62) is determined (block 63) as expressed by the equation:

$$diff = |MV_i - MV_{i-1}| \qquad (1)$$

where diff is a local variable and $MV_i$ and $MV_{i-1}$ are the current and previous marginal values 34, respectively, for the current flight leg departure 31. Diff measures the change which occurred between the current marginal value 34 as calculated during the present iteration of the outer control loop (blocks 61–67) versus the previous marginal values 34 as calculated during the previous iteration. If diff is greater than max_diff (block 64), max_diff is set to diff (block 65) since diff reflects the biggest change in marginal value that has occurred up through this iteration of the inner control loop (blocks 62–66). Otherwise, max_diff remains unchanged (block 64).

If other flight leg departures 31 remain (block 66), that is, must be evaluated for a locally optimal marginal value 34, control returns to the top of the inner control loop (block 62–66) for further processing. Otherwise, if the last flight leg departure has been evaluated (block 66), the inner control loop (block 62–66) is exited.

In the described embodiment, a convergence criterion is used in determining whether globally optimal marginal values 34 have been found. Consequently, the outer control loop (blocks 61–67) is performed for an indefinite number of iterations until the maximum difference (as stored in the local variable max_diff) between the current and previous marginal values 34 out of all of the flight leg departures 31 is less than the convergence criterion. In the described embodiment, a convergence criterion of 0.02 (corresponding to 2 cents) is used, although any other desired convergence criterion value could be used.

Thus, if max_diff is less than convergence (block 67), control returns to the top of the outer control loop (block 61–67) for further processing. Otherwise, a globally optimal marginal value 34 has been obtained for each of the flight leg departures 31 (block 67) and the function returns.

A maximum iteration limit is used to prevent the function from running endlessly in the case of an error. If the iteration count exceeds the maximum iteration limit (block 68), the system will report the error condition of non-convergence (block 69) and return. In the described embodiment, a maximum iteration limit of 100 is used, although any other desired iteration limit could be used.

C. Supply-Demand Balance Optimization Function

Figure 6:
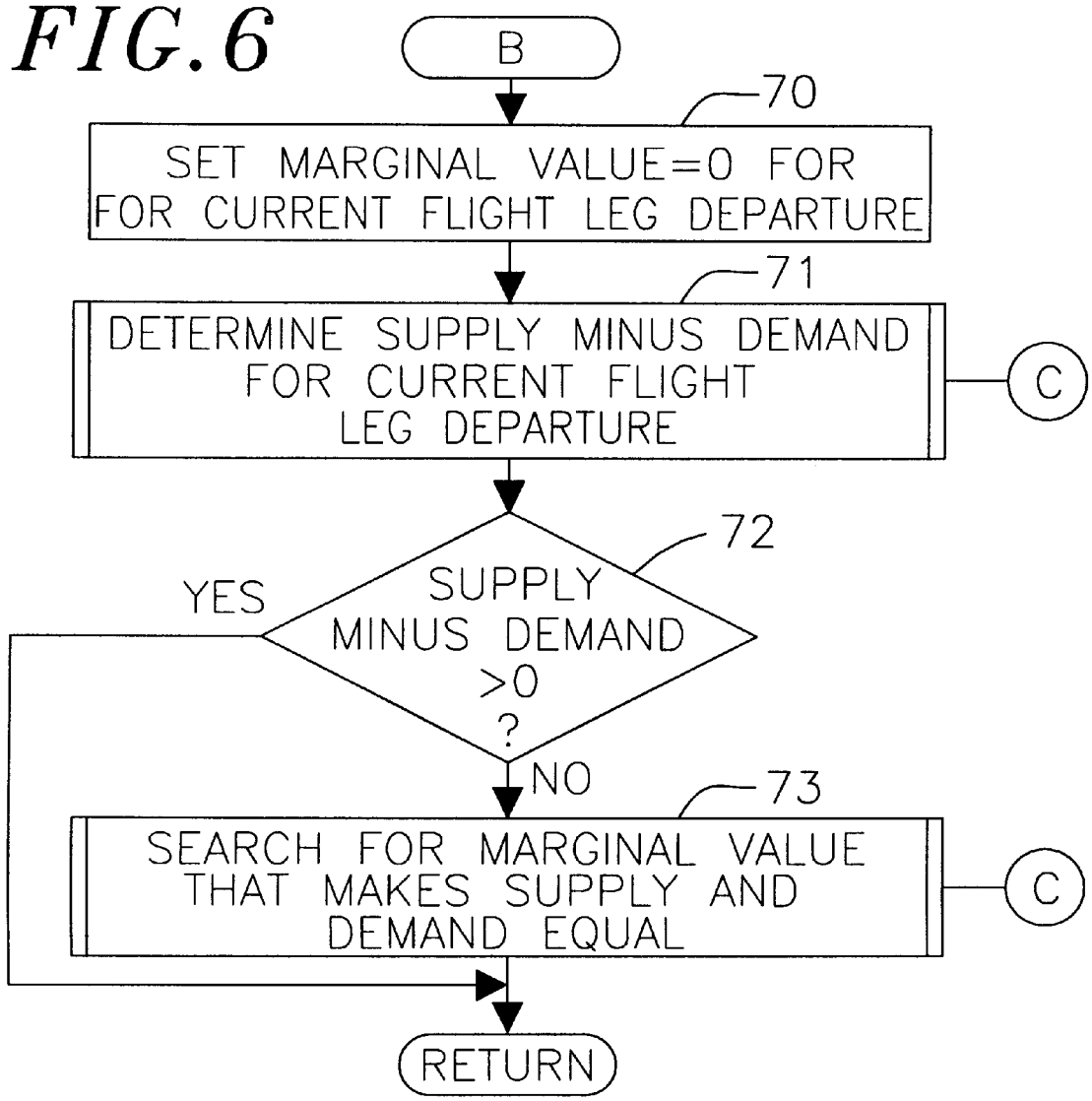
FIG. 6 is a flow diagram of a supply-demand balance optimization function used by the function of FIG. 5.

FIG. 6 is a flow diagram of a supply-demand balance optimization function (block 62) as used by the iterative function of FIG. 5. Its purpose is to find a locally optimal marginal value 34 based on the assumption that the demand for seats is deterministic and that the optimal marginal value is that which substantially balances supply and demand.

The marginal value 34 for the current flight leg departure 31 is initialized to 0 (block 70). The demand for the current flight leg departure 31 is determined using a demand determination function that creates a demand curve as a function of marginal value 34 (shown in FIGS. 7A and 7B) as further described hereinbelow in FIG. 8. The difference between the supply of seats 44 available on the current flight leg departure 31 and the corresponding demand for seats (as returned by the determination function of FIG. 8) is determined (block 71). If the difference of supply 44 minus demand is greater than 0 (block 72), there are more seats available on the current flight leg departure 31 than in demand, that is, supply 44 exceeds demand, and the marginal value 34 remains at 0. The function then returns. Otherwise, if the difference of supply 44 minus demand is less than or equal to 0 (block 72), the demand determination function of FIG. 8 is repeatedly called and the difference between supply 44 and demand taken until a marginal value 34 that makes supply 44 and demand equal is found (block 73). The function then returns. The operation of this function will now be described with reference to FIGS. 7A and 7B which show graphs of flight leg departure demand curves 81 and 85, respectively.

Figure 7B:
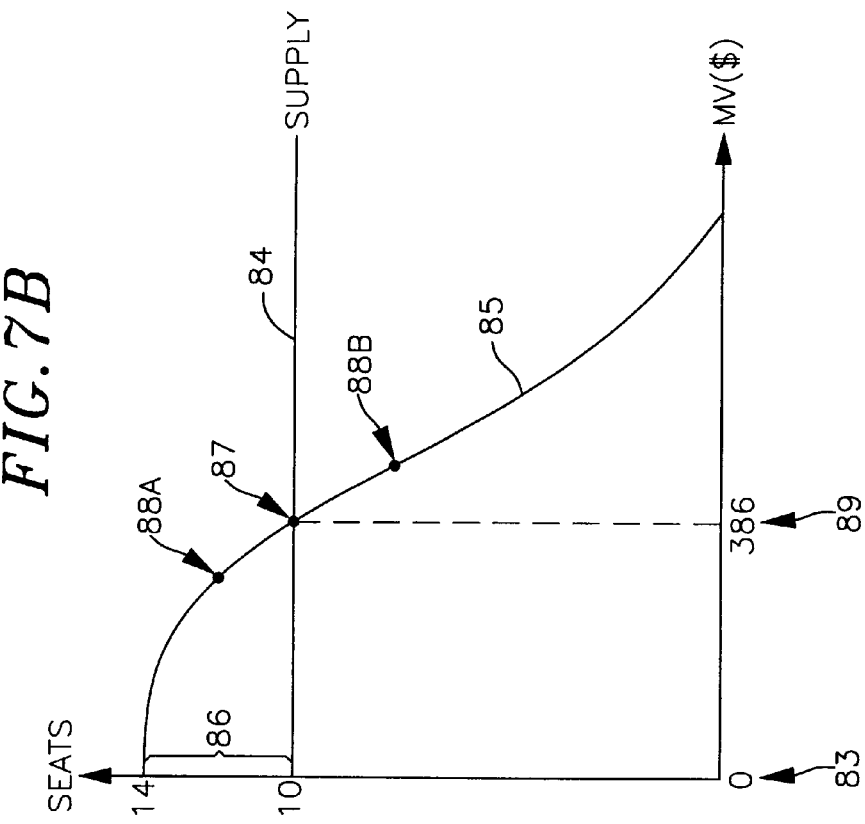
FIGS. 7A and 7B show graphs of flight leg departure demand curves generated by the flight leg departure demand determination function of FIG. 8.
Figure 7A:
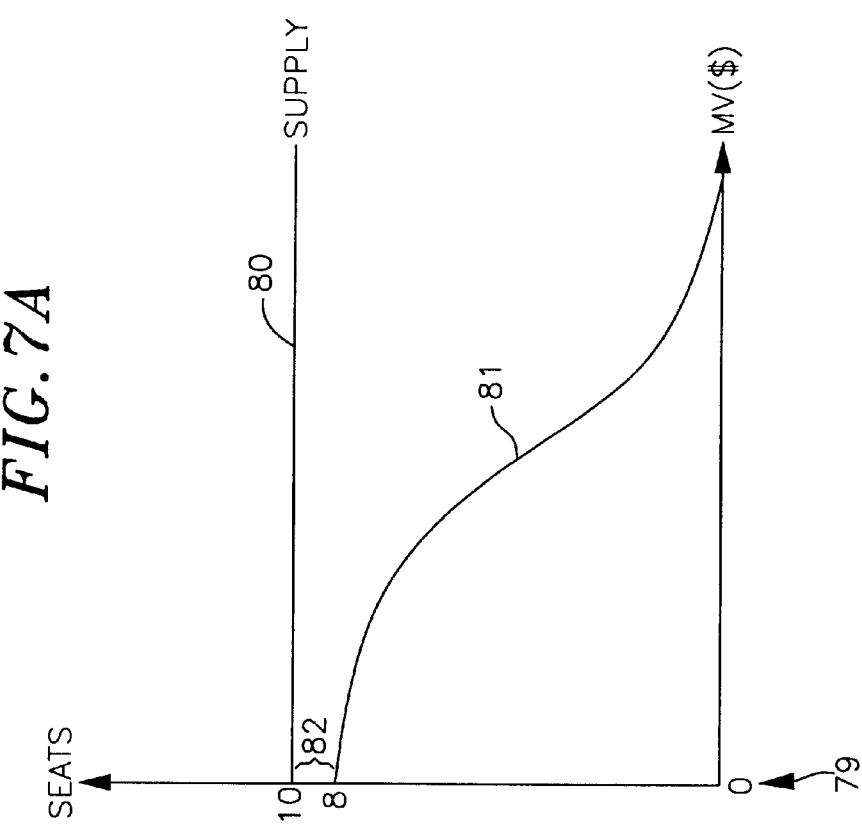
Figure 8:
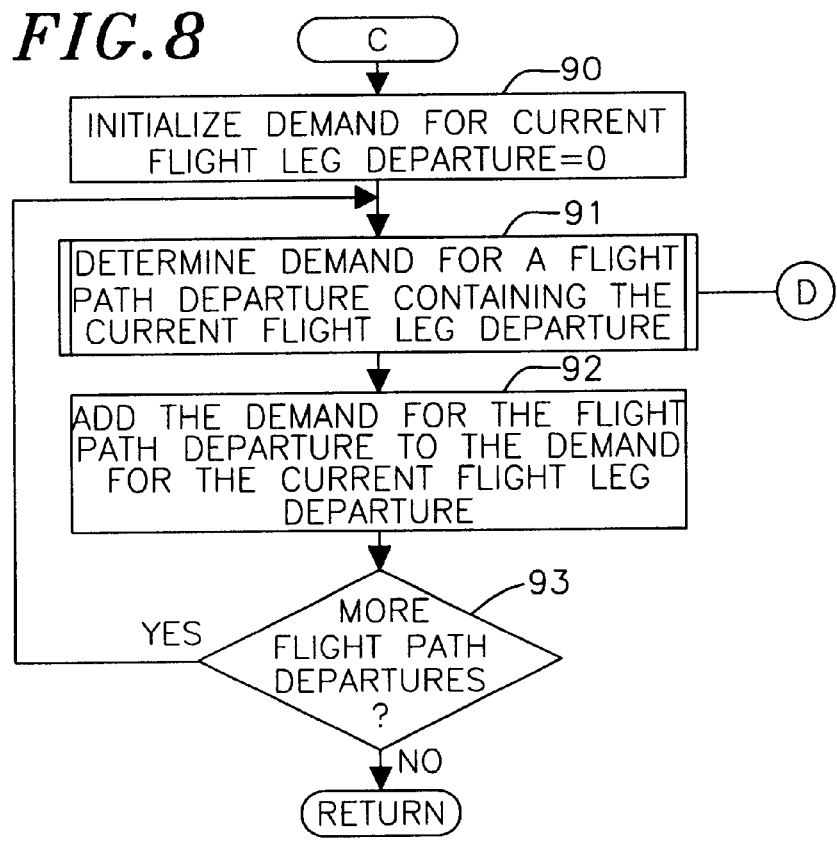
FIG. 8 is a flow diagram of a flight leg departure demand determination function.

The graphs of FIGS. 7A and 7B illustrate the two cases selected by the decision block 72 of FIG. 6. The x-axis represents marginal values expressed in dollars and the y-axis represents seats on the current flight leg departure 31. The supply of seats 44 (as indicated by line 80 in FIG. 7A and by line 84 in FIG. 7B) is provided by the airline revenue management system 15 as an input parameter. The demand curve (as indicated by line 81 in FIG. 7A and by line 85 in FIG. 7B) is generated by the flight leg departure demand determination function of FIG. 8.

By way of example, assume that a marginal value 34 for the ORD-JFK flight leg departure 31 is being determined with a supply of seats 44 for this flight leg departure equalling 10. In FIG. 7A, the situation where the difference between supply 44 minus demand is greater than 0 is shown. At point 79, the marginal value 34 equals 0, supply 44 equals 10 and demand equals 8. Thus, the difference 82 between supply 80 and demand 81 equals 2 and is therefore greater than 0. This situation indicates that the supply 44 exceeds the demand and any non-zero marginal value is therefore meaningless. In such cases, a marginal value 34 equaling 0 will be returned.

In FIG. 7B, the situation where the difference between supply 44 minus demand is less than or equal to 0 is shown. At point 83, the marginal value 34 equals 0, supply 44 equals 10 and demand equals 14. Thus, the difference 86 between supply 84 and demand 85 equals -4 and is therefore less than 0. This situation indicates that the demand exceeds the supply 44 and a non-zero marginal value is required. Thus, the intersection 87 between supply 84 and demand 85 must be found. In the described embodiment, a Van Wijngaarden-Dekker-Brent search method, such as described in W. H. Press et al., *Numerical Recipes in C—The Art of Scientific Computing*, pp. 267–69, Cambridge University Press (1988), the disclosure of which is incorporated herein by reference, is employed to search the demand curve 85 (block 73) using the flight leg departure demand determination function of FIG. 8 as an input parameter along with the supply 44. This function is used to generate candidate demand points 88a, 88b along the demand curve 85 as the Van Wijngaarden-Dekker-Brent search method searches for the intersection 87. In effect, the search moves along the x-axis using a candidate marginal value 34 at each candidate demand point 88a, 88b and the demand for seats at each candidate demand point 88a, 88b is compared to the supply 44. Once the intersection 87 is found, the marginal value 34, here, equalling $386, is obtained as a point 89 along the x-axis.

FIG. 8 is a flow diagram of a flight leg departure demand determination function (blocks 71 and 73) as used by the supply-demand optimization function of FIG. 6. Its purpose is to generate the demand curve 81, 85 for the current flight leg departure 31 as a function of a candidate marginal value 34. The demand for the current flight leg departure 31 is initialized to 0 (block 90). The demand for a flight path departure 35 containing the current flight leg departure 31 is determined by a flight path departure demand determination function (block 91) as further described hereinbelow in FIG. 9. The value this function returns represents the demand for the flight path departure 36 at the candidate marginal value 34 for the current flight leg departure 31 and the current marginal values 34 for all other flight leg departures 31 contained in the flight path departure 36. The demand for the flight path departure 36 is added to the demand for the current flight leg departure 31 (block 92). If there are more flight path departures 36 that contain the current flight leg departure 31 (block 93), the control loop (blocks 91–93) is repeated until all flight path departures 36 that contain the current flight leg departure 31 have been processed. In effect, the control loop (blocks 91–93) follows every pointer 45 pointing from a flight leg departure record 31 to a flight path departure record 36 in a one-to-many relationship. When no more flight path departures 36 remain (block 93), the function returns.

Figure 9:
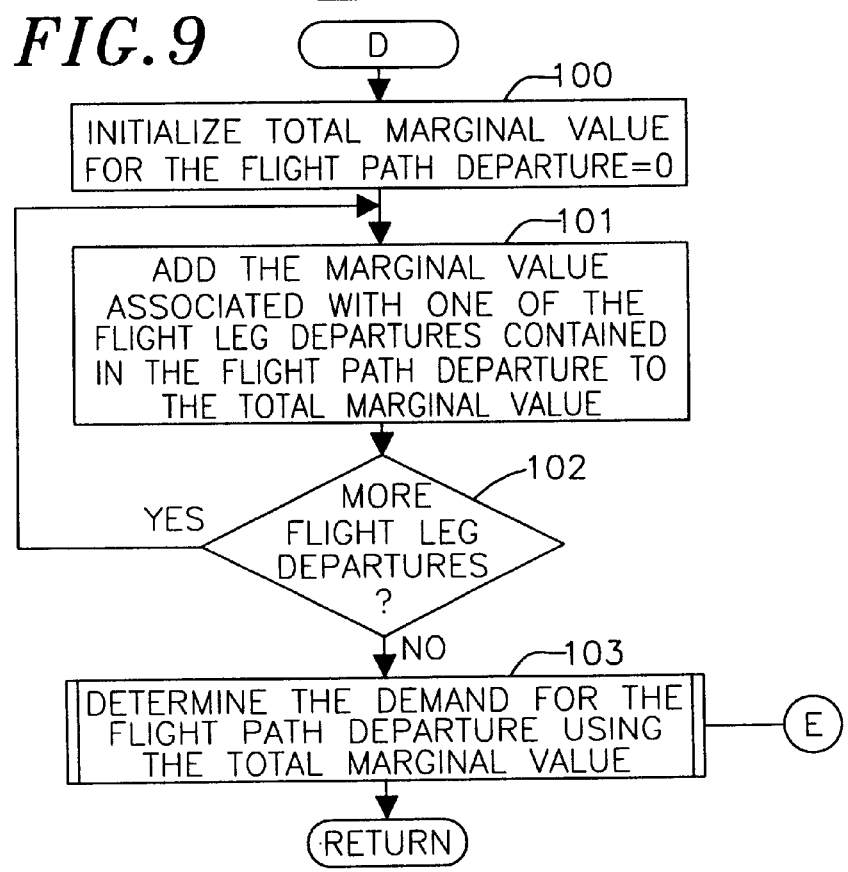
FIG. 9 is a flow diagram of a flight path departure demand determination function.

FIG. 9 is a flow diagram of a flight path departure demand determination function (block 91) as used by the function of FIG. 8. Its purpose is to determine the demand for the current flight path departure 36 using the total of the marginal values 34 of the flight leg departures 31 contained in the flight path departure 36. The total marginal value for the current flight path departure 36 is initialized to 0 (block 100). The marginal value 34 associated with one of the flight leg departures 31 contained in the current flight path departure 36 is added to the total marginal value (block 101). If other flight leg departures 31 contained in the flight path departure 36 remain (block 102), control returns to the top of the control loop (blocks 101–102). In effect, the control loop (blocks 101–102) follows every pointer 45 pointing from a flight path departure record 36 to a flight leg departure record 31 in a one-to-many relationship. When the marginal values 34 for all of the flight leg departures 31 contained in the flight path departure 36 have been added to the total marginal value (block 102), the demand for the flight path departure 36 is determined by a flight path departure demand search function (block 103) using the total marginal value as further described hereinbelow in FIG. 10. The function then returns.

Figure 10:
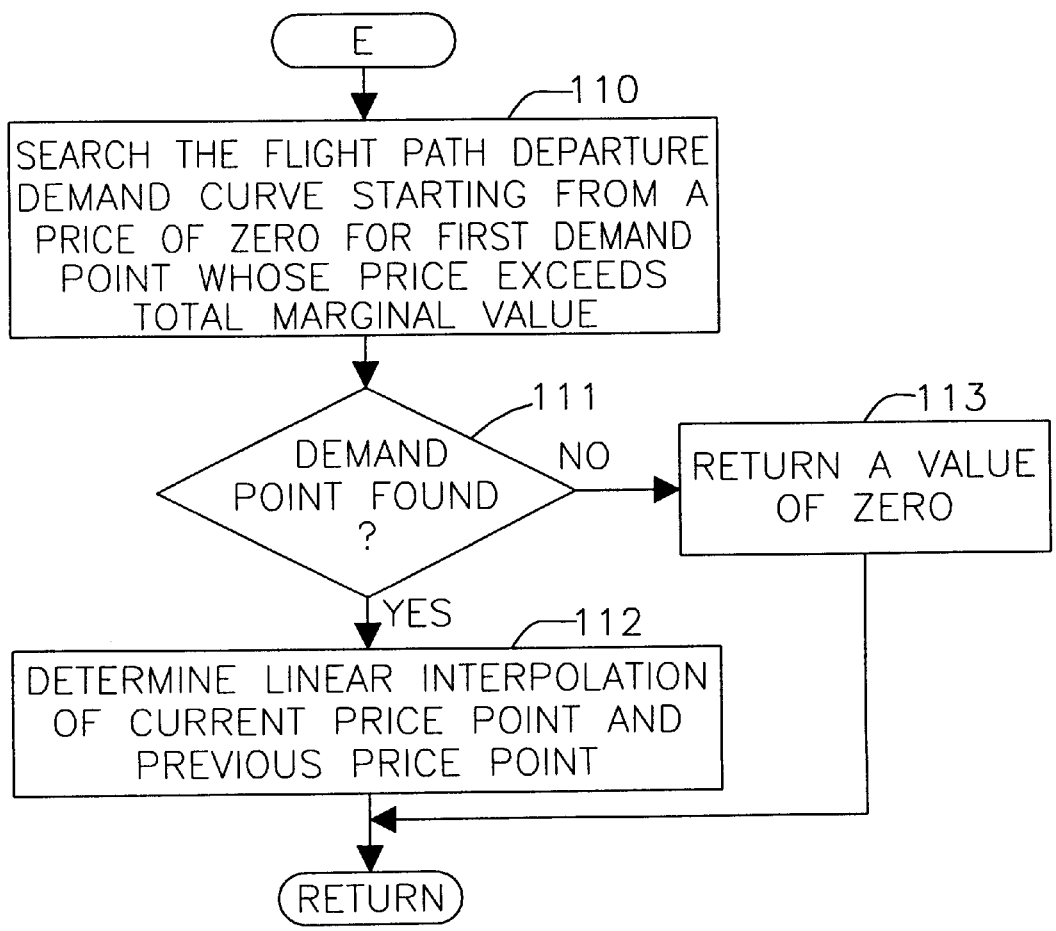
FIG. 10 is a flow diagram of a flight path departure demand search function.

FIG. 10 is a flow diagram of the flight path departure search function (block 103) used by the function of FIG. 9. Its purpose is to find points on a flight path departure demand curve 121 (shown in FIG. 11A) that bracket the supply and to perform a linear interpolation of the demand curve 121 for the flight path departure 36 as a function of the total marginal value. The search and linear interpolation will be explained with reference to FIG. 11A which shows a graph of the flight path departure demand curve 121. This curve is represented by an additional data structure (not shown) used by the supply-demand balance optimization function (shown in FIG. 6) and is created during the construction of the internal data structures in block 51 of FIG. 4.

Figure 11A:
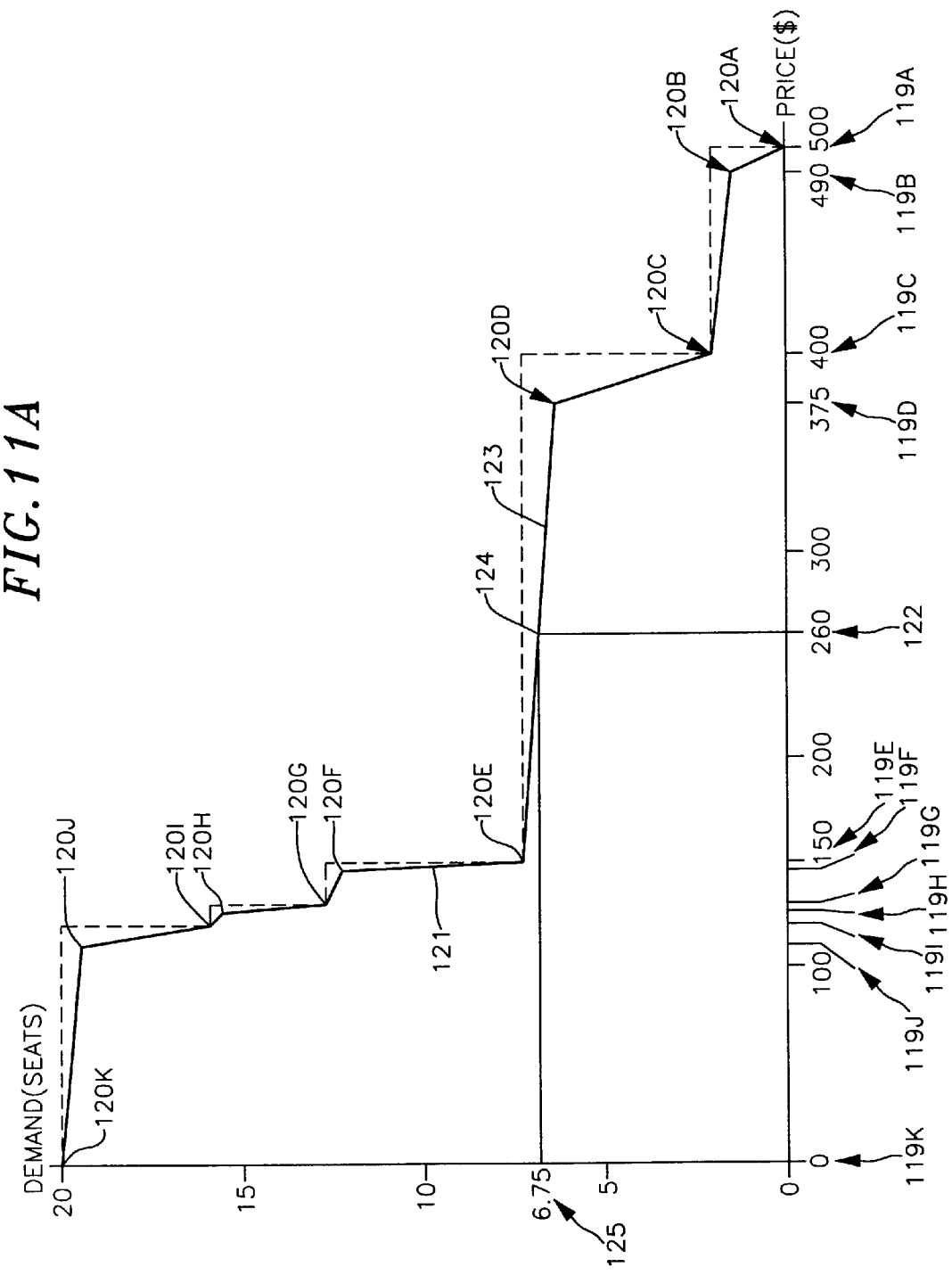
FIG. 11A shows a graph of a flight path departure demand curve used by the search function of FIG. 10.

In the graph of FIG. 11A, the x-axis represents the price of the current flight path departure 36 expressed in dollars and the y-axis represents the demand expressed in seats. Each flight path departure record 36 points to an associated flight path departure demand curve 121 which is constructed from the demand record list 38.

The construction, by way of example, of the flight path departure demand curve 121 is accomplished by the following procedure. It is critically important that the demand curve 121 be continuous as guaranteed by the following procedure. Starting with the first demand record 39 on the demand record list 38, that is, with the demand record 39 storing the highest booking class price 40, points of the form (price, demand) are added to the demand curve list 38. The first point in the example is:

$$(BCP_1, 0)$$

where $BCP_1$ is the booking class price 40 of the first demand record 39. Points are inserted onto the demand curve 121 of the form:

$$(BCP_i, \text{cumulative\_mean}) \qquad (2)$$

where $BCP_i$ is the booking class price 40 of the successive demand records i and cumulative_mean is the accumulation of the mean demand 41 using the formula:

$$\text{cumulative\_mean} +\!= \text{mean}_{i-1} \qquad (3)$$

where $\text{mean}_{i-1}$ is the mean demand of the demand record 39 before i. After reading the last demand record 39, one more point is added:

$$(0, \text{cumulative\_mean})$$

where cumulative_mean includes the mean demand of the last demand record 39 in the demand record list 38.

Once the demand curve 121 is constructed from points in the demand record list 140, additional points are inserted between each of the existing points in the demand curve 121. The form of the inserted point is:

$$(\text{price}_i, \text{demand}_i) \qquad (4)$$

where $\text{price}_i$ and $\text{demand}_i$ are given by the formulas:

$$\text{price}_i = \text{price}_{i+1} + (\text{price}_{i-1} - \text{price}_{i+1}) \times IF \qquad (5)$$

and $$\text{demand}_i = \text{demand}_{i-1} + (\text{demand}_{i+1} - \text{demand}_{i-1}) \times IF \qquad (6)$$

where $\text{price}_{i+1}$ and $\text{demand}_{i+1}$ are the price and demand of the point on the demand curve following the inserted point and $\text{price}_{i-1}$ and $\text{demand}_{i-1}$ are the price and demand of the point on the demand curve preceding the inserted point. IF is a parameter called the interpolation factor. In the described embodiment, the value of the interpolation factor is 0.9, but any other value greater than 0.5 and less than 1.0 could be used depending on the needs of the application.

FIG. 11B is a table showing, by way of example, the results of the demand curve construction using the demand records 39 (shown in FIG. 3). The odd numbered points (120a, 120c, 120e, 120g, 120i, 120k) were inserted using formula (2). For example, point 120e has a price of $150 which comes from the third demand record 39 in the demand record list 38 (having a booking class price 40 of $150) and a demand of 2+5=7 which is the accumulated demand of the first two demand records 39 in the demand record list 38. The even numbered points (120b, 120d, 120f, 120h, 120j) were calculated with formulas (4), (5) and (6). For example, point 120d is calculated as follows $$\text{price}_{120d} = 150 + ((400-150) \times 0.9) = 375.0$$

and $$\text{demand}_{120d} = 2 + ((7-2) \times 0.9) = 6.5$$

The points 120a, 120b, 120c, 120d, 120e, 120f, 120g, 120h, 120i, 120j, 120k in FIG. 11B are graphed as shown in FIG. 11A. The prices are shown on the x-axis and are labelled 119a, 119b, 119c, 119d, 119e, 119f, 119g, 119h, 119i, 119j, 119k.

The graph of FIG. 11A also illustrates the search and linear interpolation of the flight path departure demand curve 121 performed by the flight path departure search function of FIG. 10. The formula for interpolated demand is:

$$\text{interpolated\_demand} = \text{demand}_{i-1} \frac{(TMV - \text{price}_i)}{(\text{price}_{i-1} - \text{price}_i)} + \text{demand}_i \frac{(\text{price}_{i-1} - TMV)}{(\text{price}_{i-1} - \text{price}_i)} \qquad (7)$$

where $\text{price}_i$ and $\text{demand}_i$ are the price and demand of the point with a price greater than the total marginal value, TMV, and $\text{price}_{i-1}$ and $\text{demand}_{i-1}$ are the price and demand of the point with a price less than or equal to TMV.

The function depicted in FIG. 10 starts with a search starting from 0 for the first demand point with a price greater than the total marginal value (blocks 110). If no such demand point is found (block 111), the function terminates and returns a value of 0 (113). FIG. 11A shows, by way of example, a total marginal value equalling $260, as indicated at point 122. The first point with a price greater than $260 is (375, 6.5). The point (375, 6.5) and the previous point (150, 7.0) are interpolated (block 112) by applying formula (5) as follows:

$$6.5 \times \frac{(260-150)}{(375-150)} + 7.0 \times \frac{(375-260)}{(375-150)} = 6.76$$

The interpolation is shown graphically as the intersection point 124 of the line 123 and the total marginal value 122 between the points 120d and 120e. The resulting demand value 125 is calculated and the function returns.

D. Expected Marginal Seat Revenue (EMSR) Optimization Function

Figure 12:
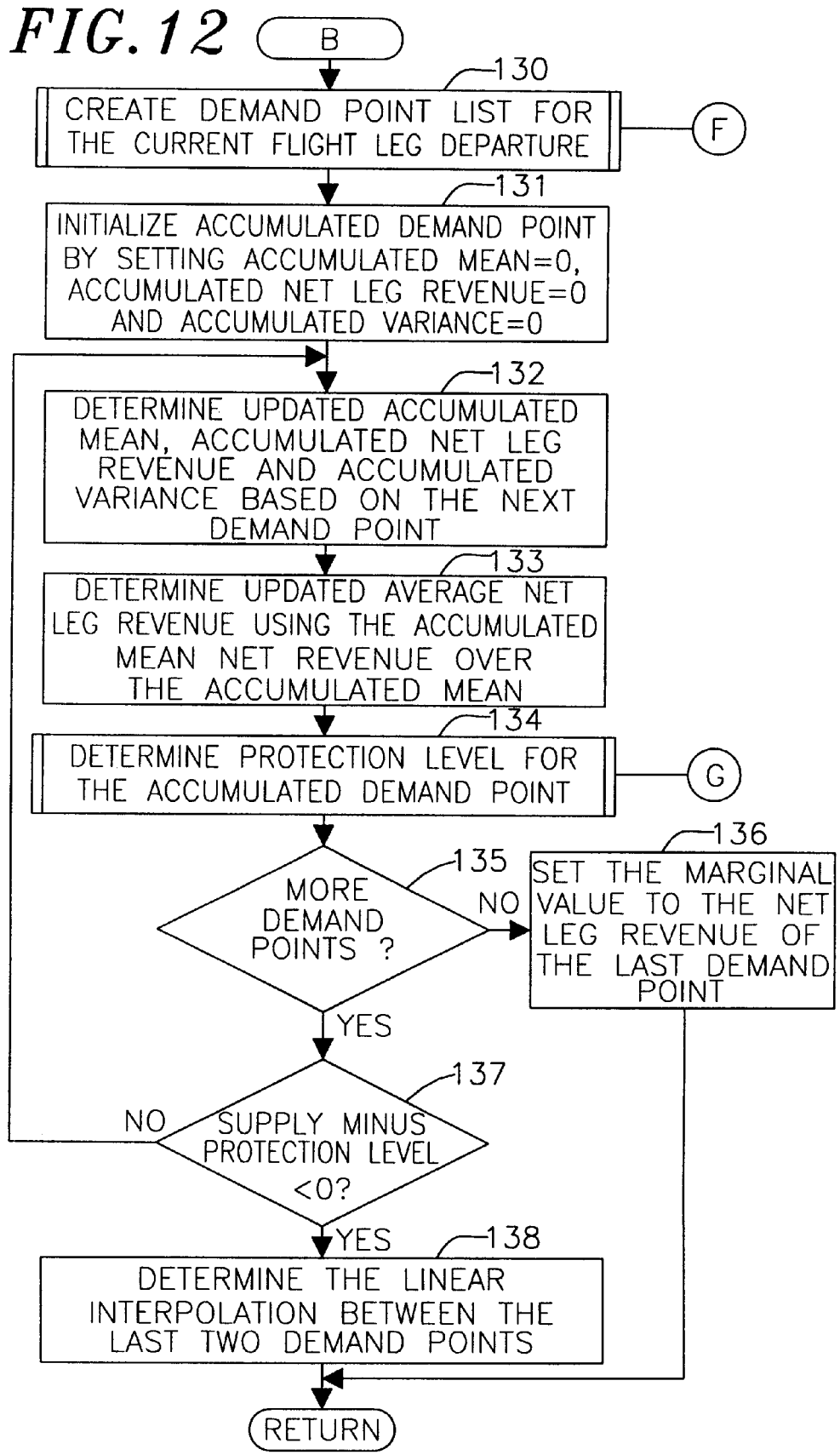
FIG. 12 is a flow diagram of an expected marginal seat revenue (EMSR) optimization function used by the function of FIG. 5.

FIG. 12 is a flow diagram of an EMSR optimization function (block 62) as alternatively used by the iterative function of FIG. 5. Its purpose is to find a locally optimal marginal value 34 based on the assumption that the demand for seats is uncertain, that is, non-deterministic. This assumption is commonly used in leg-based airline yield management systems, such as described in P. Belobaba, *Application of a Probabilistic Decision Model to Airline Seat Management Control*, 37 Operations Research, pp. 183–97 (1989) and R. D. Wollmer, *An Airline Seat Management Model for a Single Leg Route When Lower Fare Classes Book First*, 40 Operations Research, pp. 26–37 (1992), the subject matters of which are incorporated herein by reference.

The EMSR approach uses values known as protection levels in a similar way that demand is used in the supply-demand balance function. The EMSR method also uses a new data structure called a demand point list 140 (shown in FIG. 14B) and the concept of an accumulated demand point which will be described in the discussion of FIG. 12. The EMSR optimization function (shown in FIG. 12) will now be described.

A demand point list 140 (shown in FIG. 14B) is created for the current flight leg departure 31 using a function (block 130) further described hereinbelow in FIG. 14A.

An accumulated demand point is initialized in block 131. An accumulated demand point consists of six local variables: accumulated mean 152, accumulated net leg revenue 153, accumulated variance 154, average net leg revenue 155, protection level 156 and next net leg revenue 157, several values of which are shown in FIG. 14C. The accumulated demand point is initialized by setting the accumulated mean 152, accumulated net leg revenue 153 and accumulated variance 154 to 0 (block 131). These variables are used for storing accumulated totals derived from the demand points in the demand point list 140 for the current flight leg departure 30. The average net leg revenue 155 and the protection level 156 are also initialized to 0. The initial value of the next net leg revenue 157 is set to the value of the net leg revenue 142 of the first demand point 141a in the demand point list 140.

Figure 13:
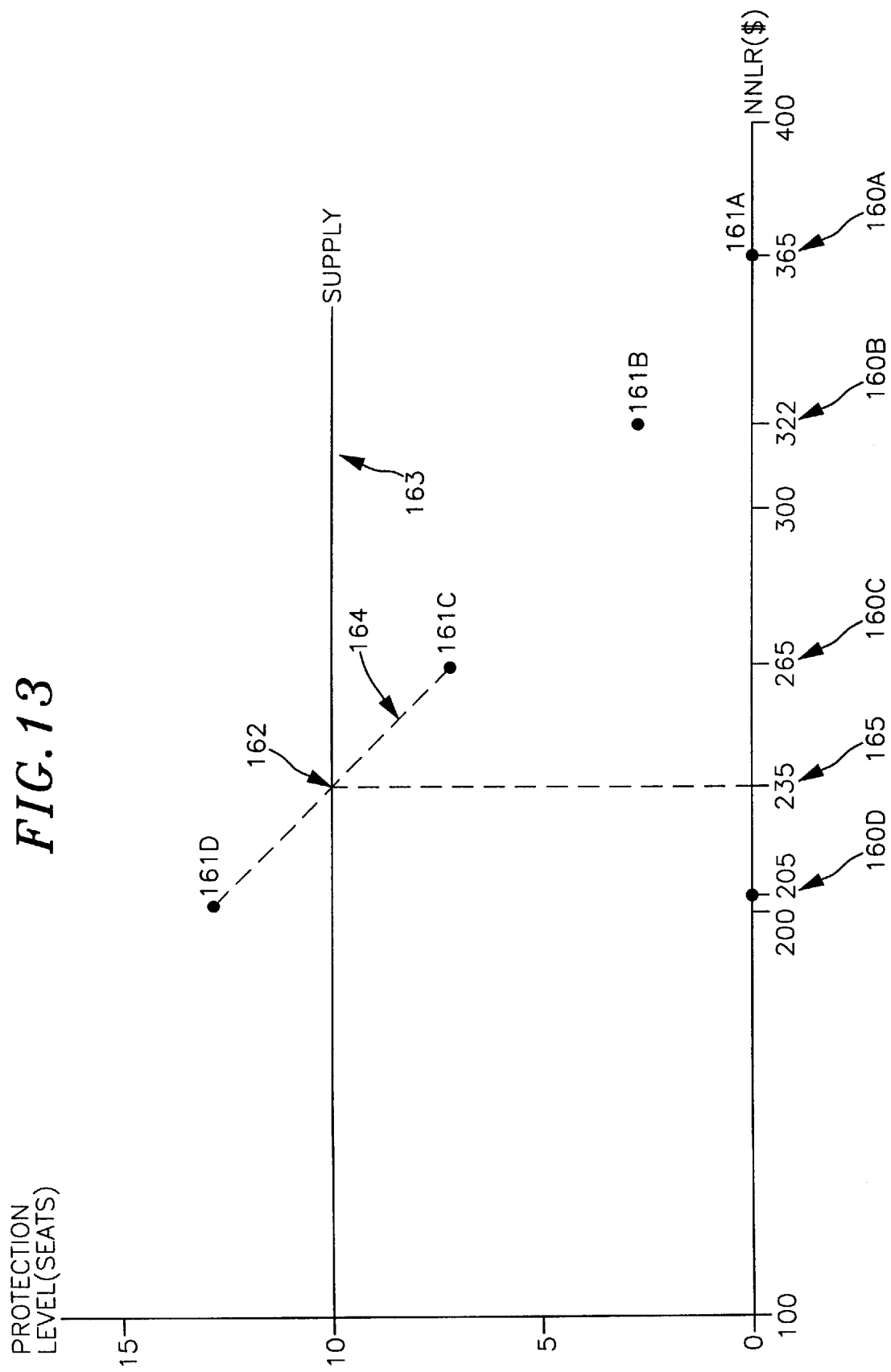
FIG. 13 shows a graph of a flight leg departure protection level curve generated by the EMSR optimization function of FIG. 12.

The first accumulated demand point 161a is plotted on the graph shown in FIG. 13 using the next net leg revenue 157 on the x-axis and the protection level 156 on the y-axis. The remaining accumulated demand points 161b, 161c, 161d are iteratively determined using a control loop (blocks 132–137) that sequentially processes each demand point in the demand point list 140 starting with the point with the highest average net leg revenue 142. During each successive iteration of the control loop (blocks 132–137), the accumulated mean 152, accumulated net leg revenue 153 and accumulated variance are updated (block 132) based on the next demand point in the demand point list 140. The updated accumulated mean 152 is determined as expressed by the equation:

$$\text{accumulated\_mean} \mathrel{+}= \text{mean}_i \tag{8}$$

where $\text{mean}_i$ is the mean 143 for the next demand point in the demand point list 140. The updated accumulated net leg revenue (NLR) 153 is determined as expressed by the equation:

$$\text{accumulated\_NLR} \mathrel{+}= NLR_i \times \text{mean}_i \tag{9}$$

where $NLR_i$ is the net leg revenue 142 and $\text{mean}_i$ is the mean 143 for the next demand point in the demand point list 140. The updated accumulated variance is determined as expressed by the equation:

$$\text{accumulated\_variance} \mathrel{+}= \text{var}_i \tag{10}$$

where $\text{var}_i$ is the variance 144 for the next demand point in the demand point list 140.

The average net leg revenue (NLR) 155 is determined by dividing the accumulated net leg revenue 153 by the accumulated mean 152 (block 132) as expressed by the equation:

$$\text{average\_NLR} = \frac{\text{accumulated\_NLR}}{\text{accumulated\_mean}} \tag{11}$$

where accumulated_mean was calculated in equation (8) and accumulated_NLR was calculated in equation (9). This value represents a weighted average of the net leg revenues 142 for each demand point from the top of the demand point list 140 up through the current demand point. A protection level 156 is determined for the accumulated demand point using a function (block 134) further described hereinbelow in FIG. 15. Finally, the value of the next net leg revenue 157 is set to the value of the net leg revenue 142 of the next demand point in the demand point list 140. If there are no more demand points in the demand point list 140, the value of the next net leg revenue 157 is set to 0. If all of the demand points in the demand point list 140 have been processed (block 135), the marginal value 34 is set to the net leg revenue 142 of the last demand point in the demand point list 140 (block 136) and the function returns. Otherwise, if more demand points remain (block 135) and the difference of supply 44 minus protection level 155 is greater than 0 (block 137), control continues at the top of the control loop (blocks 132–137) for processing of the next demand point.

Otherwise, if the difference of supply 44 minus protection level 156 is less than or equal to 0 (block 137), the marginal value 34 is determined by using linear interpolation between the last two accumulated demand points (block 138) as expressed by the equation:

$$NNLR_{i-1} \times \frac{(PL_i - \text{supply})}{(PL_i - PL_{i-1})} + NNLR_i \times \frac{(\text{supply} - PL_{i-1})}{(PL_i - PL_{i-1})} = MV \tag{12}$$

where $NNLR_i$ and $NNLR_{i-1}$ are the next net leg revenues 157 of the last two accumulated demand points, supply is the supply of seats 44, $PL_i$ and $PL_{i-1}$ are the protection levels 156 for the last two accumulated demand points and MV is the marginal value 34.

The linear interpolation will be explained with reference to FIG. 13 which shows a graph of a flight leg departure protection level curve generated by the function of FIG. 12. The x-axis represents the next net leg revenue 157 expressed in dollars and the y-axis represents the protection level 156 expressed in seats. Accumulated demand points 161a, 161b, 161c, 161d, are graphed as a function of their respective next net leg revenue 157 points 160a, 160b, 160c, 160d.

By way of example, assume that a marginal value 34 for the ORD-JFK flight leg departure 31 is being determined with a supply of seats 44 for this flight leg departure equalling 10. Protection levels are calculated as illustrated, by way of example, in the table of FIG. 14C. Each row 151a, 151b, 151c, 151d corresponds to an accumulated demand point as determined during each successive iteration of the control loop (blocks 132–137). Each column corresponds to an accumulated mean 152, accumulated net leg revenue 153, accumulated variance 154, average net leg revenue 155, protection level 156 and next net leg revenue 157. Row 151*a* represents the initialized value of the accumulated demand point. Row 151*b* represents values determined during the first iteration of the control loop (block 132–137), row 151*c* during the second iteration and row 151*d* during the third iteration.

Using row 151*c* as an example, the accumulated mean 152 is calculated using equation (8) as follows:

$$2+4=6$$

The accumulated net leg revenue 153 is calculated using equation (9) as follows:

$$(365 \times 2)+(322 \times 4)=2018$$

The accumulated variance 154 is calculated using equation (10) as follows:

$$2018/6=336$$

$$1+3=4$$

The average net leg revenue 155 is calculated using equation (11) as follows:

The protection level 156 is determined by a function (block 134) which is described further hereinbelow in FIG. 15. The next net leg revenue 157 is 265 which is the value of the net leg revenue 142 of the third demand point 141C on the demand point list 40. In this example, the result of the protection level calculation is 7.

Starting from the first accumulated demand point 151*a*, protection levels 156 are calculated and compared to supply 44. The first accumulated demand point 151*a* has a protection level 156 of 0 which is less than the supply 44 of 10. This first point is plotted as point 161*a* in the graph of FIG. 13. The second accumulated demand point 151*b* has a protection level 156 of 3 which is also less than the supply 44 of 10. This second point is plotted as point 161*b* in the graph of FIG. 13. The third accumulated demand point 151*c* has a protection level 156 of 7 which is also less than the supply 44 of 10. This third point is plotted in the graph of FIG. 13 as point 161*c*. The fourth accumulated demand point 151*d* has a protection level 156 of 13 which is larger than the supply 44 of 10 which is the first demand point at which the difference of supply 44 minus protection level 156 is less than 0 (block 137). The difference of supply 44 minus protection level 156 is 10−13=−3. Since −3 is less than 0 (block 137), an interpolated marginal value 34 is determined between the accumulated demand points 161*c* and 161*d* by equation (12) as follows:

$$\$265 \times \frac{(13-10)}{(13-7)} + \$205 \times \frac{(10-7)}{(13-7)} = \$235$$

Thus, the marginal value 33 is $235. The intersection 162 between the supply 44 (as indicated by line 163) and the interpolated demand (as indicated by line 164) falls at the point 165 on the x-axis where NNLR equals 235, the interpolated marginal value 34. Once this marginal value has been found (using equation (12)), the function returns.

Figure 14A:
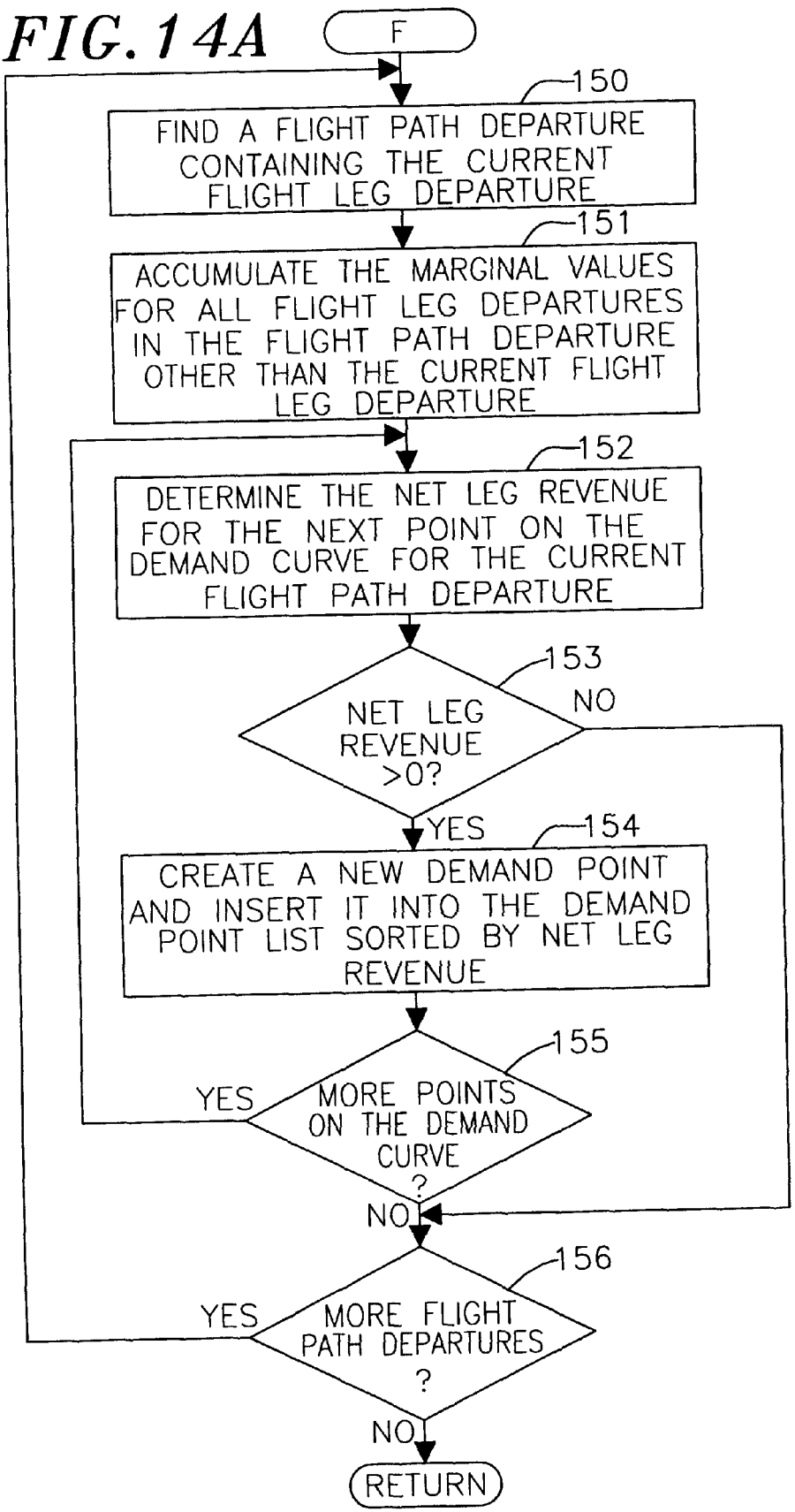
FIG. 14A is a flow diagram of a demand point list creation function.

FIG. 14A is a flow diagram of a demand point list creation function (block 130) as used by the function of FIG. 12. A flight path departure 36 containing the current flight leg departure 31 is found by using the pointers 45 from the flight path departures 36 to the flight leg departures 31 (shown in FIG. 3). The marginal values 34 for all of the flight leg departures 31 contained in the flight path departure 36 except the current flight leg departure 31 are accumulated into a temporary local variable (block 151) as expressed by the equation:

$$\Sigma MV_j \qquad (13)$$

where $MV_j$ is the marginal value 34 for a flight leg departure 31 contained in the flight path departure 36 except the current flight leg departure 31.

When a marginal value for a particular flight leg departure 31 is being determined, the EMSR optimization function takes the net revenue, that is, booking class price 40, and subtracts off the marginal values for all other flight leg departures 31 occurring in the current flight path departure 36 to obtain the net leg revenue 142 for the particular flight leg departure 31 being optimized. The net leg revenue 142 for the next point on the demand curve for the current flight leg departure 31 is determined (block 152) as expressed by the equation:

$$BCP_i \Sigma MV_j \qquad (14)$$

where $BCP_i$ is the booking class price 40 for the current flight path departure 36 and $MV_j$ is the marginal value 34 for a flight leg departure 31 contained in the flight path departure 36 except the current flight leg departure 31. The net leg revenue 142 is stored in the demand point list 140 as further described hereinbelow.

If the net leg revenue 142 is greater than 0 (block 153), a new demand point is created and inserted into the demand point list 140 which is sorted in decreasing net leg revenue order (block 154). For example, demand points for booking class prices 40 of $500, 400 and $150 are shown in FIG. 14B as having been inserted into the demand point list 140. Otherwise, if the net leg revenue is less than 0 (block 153), the current iteration over the points on the demand curve is terminated since any further points would also have net leg revenues less than 0. For example, demand points for booking class prices 40 of $130 and $120 will not be inserted into the demand point list 140.

If the net leg revenue is still greater than 0 and more demand points corresponding to booking class prices 40 remain (block 155), control returns to the top of the inner control loop (block 152–155) for processing of the next demand point. Otherwise, if no further demand points remain (block 155) and more flight path departures 36 remain (block 156), control returns to the top of the outer control loop (blocks 150–156) for processing of the next flight path departure 36. This process will continue to add points to the demand point list 140. If all flight path departures have been processed (block 156), the function returns.

FIG. 14B is a data structure for a demand point list 140 as generated by the demand point list creation function of FIG. 14A. One demand point list 140 is created for each flight leg departure 31 that is to be optimized. The data structure for the demand point list 140 comprises demand point records 141*a*, 141*b*, 141*c*, 141*d*, 141*e*, 141*f* containing net leg revenue 142, mean 143 and variance 144 fields. The net leg revenue 142 field stores the net leg revenue for the demand point corresponding to a booking class price 40 as calculated with equation (14) (block 152). The mean 41 and variance 42 for each demand record 39 are copied into the demand point list 140 as mean 143 and variance 144, respectively. For convenience, the net leg revenue 142 field will be referenced whenever a particular net leg revenue is referred to hereinbelow.

FIG. 14B shows, by way of example, a demand point list 140 for the ORD-JFK flight leg departure 31. The first entry in this list, entry 141*a*, corresponds to the first demand record 39 in the demand records list 38 for the flight path departure 10 ORD-JFK-LHR-CDG as shown in FIG. 3. The first demand point encountered in the associated set of demand records 39 corresponds to the booking class price 40 of $500. Using equation (14), the net leg revenue 142 is:

$$BCP_1 - MV_{JFK-LHR} - MV_{LHR-CDG} = \$500 - \$70 - \$65 = \$365$$

where $BCP_1$ is the first booking class price 40 of $500 for the ORD-JFK-LHR-CDG flight path departure 36 and $MV_{JFK-LHR}$ and $MV_{LHR-CDG}$ are the marginal values 34 for the JFK-LHR and LHR-CDG flight leg departures 31, respectively. Entries 141*c* and 141*f* are also taken from the flight path departure 10 ORD-JFK-LHR-CDG as shown in FIG. 14B. The other entries in the demand point list 140, entries 141*b*, 141*d*, 141*e*, are taken from other flight path departures containing the ORD-JFK flight leg departure 10. The net leg revenue 142 value of $365 is stored in the demand point record 141*a*. Similar calculations apply to the remaining demand point records 141*b*, 141*c*, 141*d*, 141*e*.

FIG. 15 is a flow diagram of a protection level determination function (block 134) as used by the function of FIG. 12. Its purpose is to determine a protection level 156 for the current flight leg departure 31 being optimized as a function of the accumulated demand point. The square root of the accumulated variance 154 is taken and stored in a local variable std_dev (block 180). The cumulative inverse normal of:

$$(1-NNLR/ANLR)$$

is determined and stored in a local variable N (block 181). ANLR is the average net leg revenue 155 and NNLR is the next net leg revenue 157 of the accumulated demand point. In the described embodiment, the cumulative inverse normal is calculated using a numerical approximation, such as described in C. Hastings, *Approximations for Digital Computers*, p. 192, Princeton University Press (1955), the disclosure of which is incorporated herein by reference. The protection level 156 is determined (block 182) as expressed by the equation:

$$PL = M + N \times std\_dev \qquad (15)$$

where M is the accumulated mean 152 of the accumulated demand point and N and std_dev are defined as described above. The function then returns.

IV. Generic Marginal Value Determination Method Using Class Libraries

As a further embodiment, the MVS 16 can be structured as a generic class library using an object-oriented programming language. In the described embodiment, the C++ programming language is used; however, any object-oriented programming language can be employed. The discussion herein adopts the terminology used by the C++ programming language, but is not meant to be restrictive as to the underlying concepts.

Figure 16:
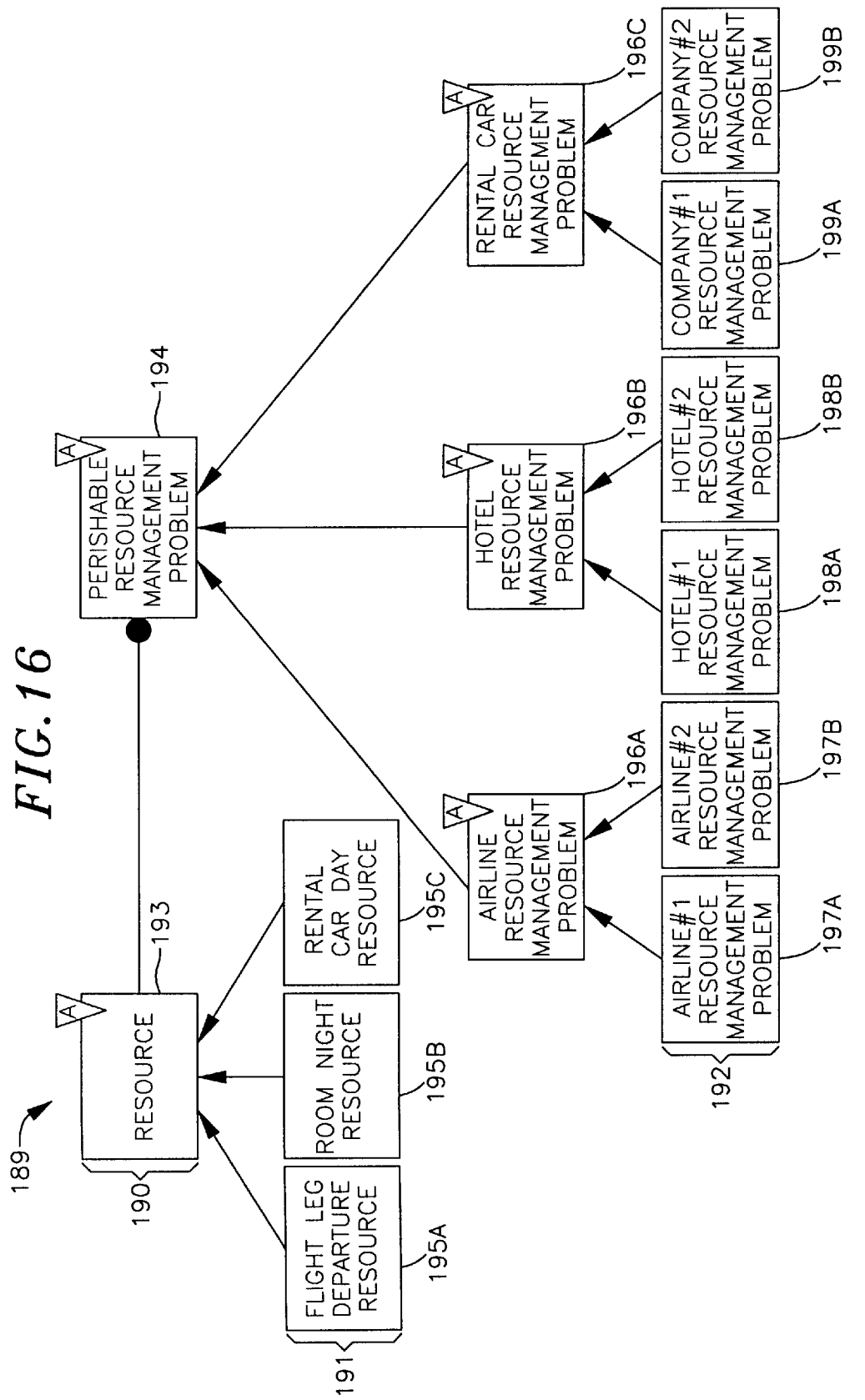
FIG. 16 is a class diagram of a class library for a method for determining marginal values for use in a revenue management system.

FIG. 16 is a class diagram of a class library 189 for a method for determining marginal values for use in a perishable resource revenue management system. The class library 189 is structured into 3 layers: a generic layer 190, an industry-specific layer 191 and a client-specific layer 192.

The generic layer 190 is used for determining marginal values for generic resources. In the described embodiment, a perishable resource problem is solved. The industry-specific layer 191 creates a set of derived classes for a particular industry. In the described embodiment, derived classes for an airline, a hotel and a rental car agency are used, although other industries are feasible. The client-specific layer 192 creates a set of derived classes for a particular client relating to the corresponding industry-specific class.

The generic layer 190 defines a base abstract resource class 193 and a perishable resource management problem (RMP) class 194. The resource class defines an interface for derived classes in the industry-specific layer 191 for a flight leg departure resource class 195*a*, a room night resource class 195*b* and a rental car day resource class 195*c*. Other derived resource classes are feasible. The resource class 193 comprises two pure virtual functions supply( ) and demand( ) (not shown). As further described hereinbelow, the functions defined in portions of the class definitions for the industry-specific layer 191 and the client-specific layer 192 override the pure virtual functions defined in the generic layer 190.

The perishable RMP class 194 is also in the generic layer 190 and defines an interface for derived abstract classes in the industry-specific layer 191 for solving an airline resource management problem 196*a*, a hotel resource management problem 196*b* and a rental car resource management problem 196*c*. Other derived abstract classes are feasible. The line connecting the perishable RMP 194 with the resource class 193 indicates that the RMP has many resources to manage.

The client-specific layer 192 comprises a set of derived classes defining the particular data manipulation functions used by a particular client's implementation to load and save data in the client's revenue management system 15 and to map the data into the generic data structures. For instance, the airline #1 resource management problem class 197*a* contains those loading, saving and mapping functions needed to utilize the generic data structures and methods for determining marginal values for airline #1. This likewise applies to the airline #2 resource management problem 197*b*, the hotel #1 resource management problem 198*a*, the hotel #2 resource management problem 198*b*, the company #1 resource management problem 199*a* and the company #2 resource management problem 199*b* classes. Other derived classes under industry-specific layer 191 class are feasible.

The resource class 193 defines a base abstract class for a generic resource for which marginal values will be determined. The particular type of resource is defined in the derived classes defined in the industry-specific layer 191. There is a one-to-one correlation between the classes derived from the resource class 193 and the specific abstract classes derived from the perishable RMP class 194. The flight leg resource class 195*a* corresponds to the airline resource management problem class 196*a*. The same applies to the room night resource class 195*b* and the hotel resource management problem class 196*b* and the rental car resource class 195*c* and the rental car resource management problem class 196*c*. The particular type of resource being solved is germane to the industry-specific layer 191 and consequently, it is unnecessary to define each resource abstractly. In other words, a flight leg departure is, for example, the common resource used by the airline resource management problem 196*a* irrespective of the particular airline.

Figure 17:
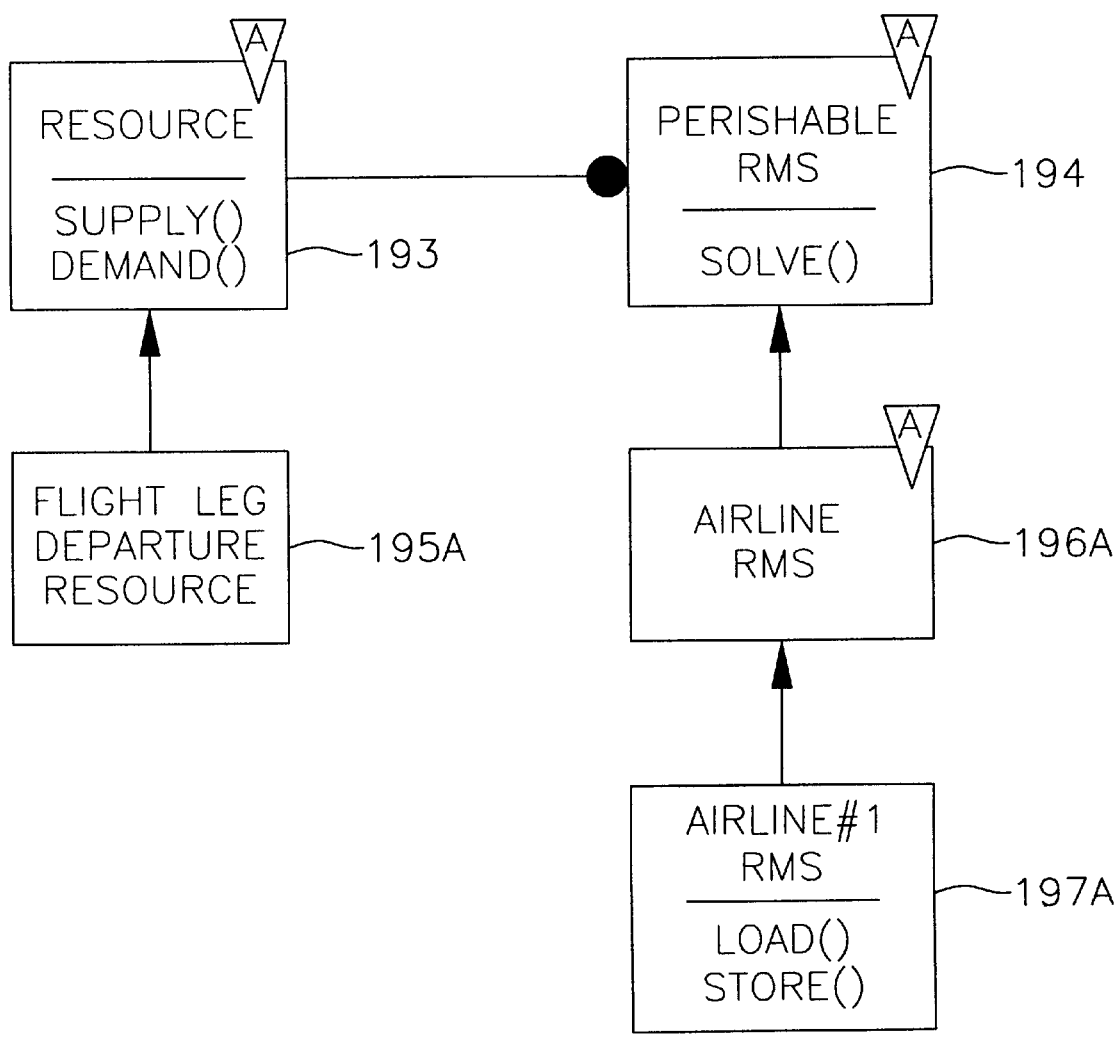
FIG. 17 is a class diagram of an instantiation of the class library of FIG. 16 for an airline reservations system.

FIG. 17 is a class diagram of an instantiation 200 of the class library 189 of FIG. 16 for an airline reservations system. The base abstract perishable RMP class 194 defines a generic function solve( ) which uses the supply( ) and demand( ) functions of the resource class 193 to solve for generic marginal values. This abstract class has a derived airline RMP class 196*a* which defines a set of data structures as shown in FIG. 3 for an airline-specific implementation. The airline RMP class 196*a* has a derived airline #1 RMS class 197*a* which contains two airline #1 specific functions, load( ) and store( ). These functions embody the necessary functionality for loading flight leg, flight path and passenger value data from and storing marginal values to airline #1's airline revenue management system 15 (shown in FIG. 2A).

The solve( ) function of the RMP class 194 is further described hereinbelow beginning in FIG. 18. The resource class 193 contains a pair of pure virtual functions supply( ) and demand( ) that are overridden by the particular supply( ) and demand( ) routines used in the instantiated problem, that is, by the functions contained in the particular industry-specific layer 191 class.

Figure 18:
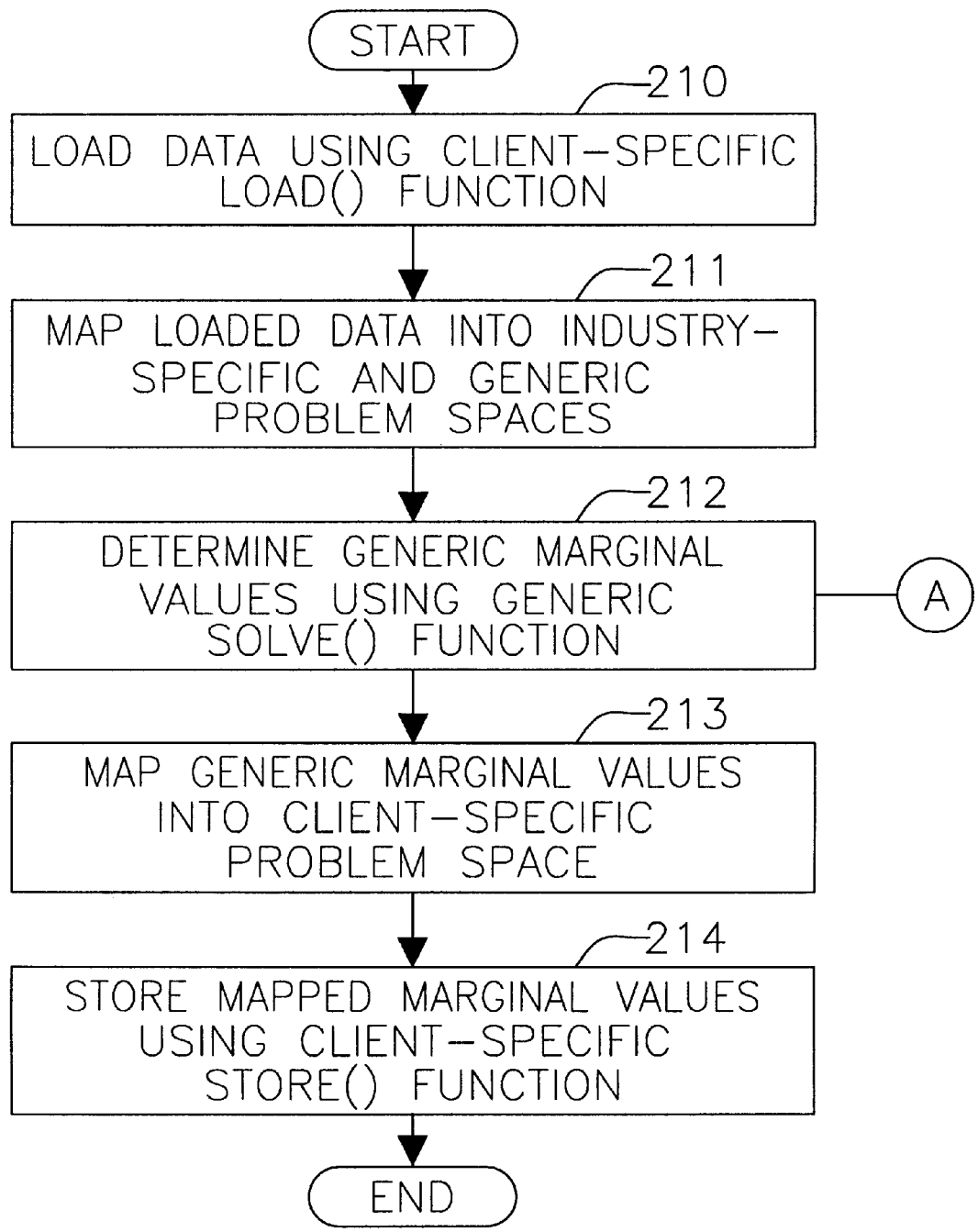
FIG. 18 is a block diagram of a method for determining generic marginal values for use in a client-specific revenue management system.
Figure 22:
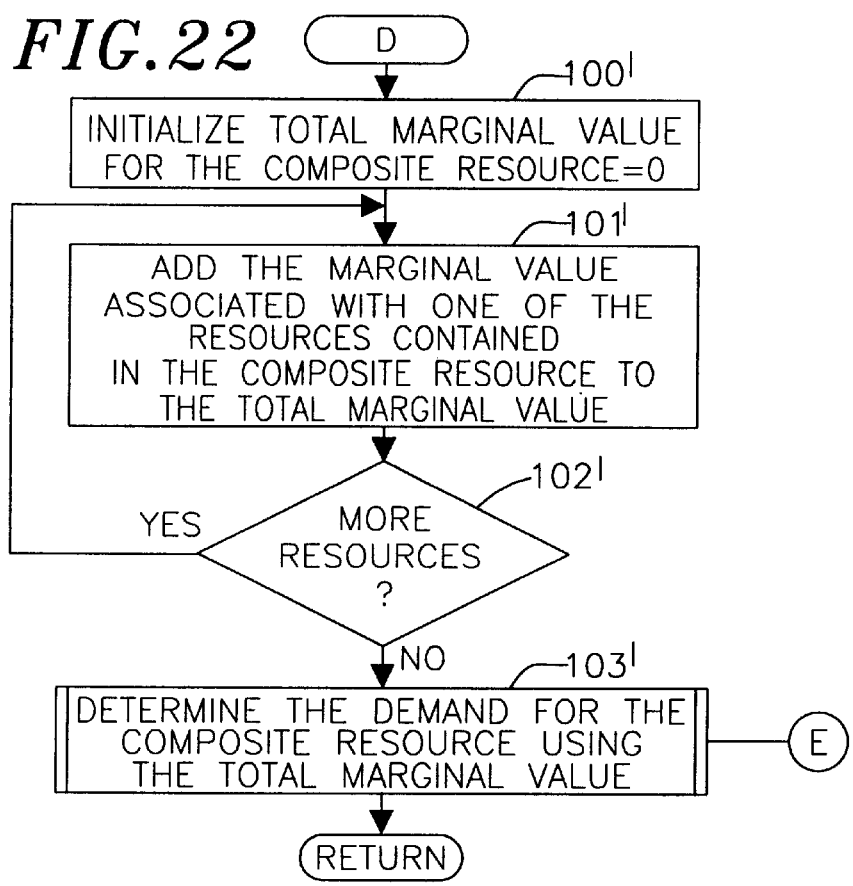
FIG. 22 is a flow diagram of a composite resource demand determination function.

FIG. 18 is a flow diagram of a method for generically determining marginal values for use in a client-specific perishable resource management system. Data is loaded using the client-specific load( ) function (block 210). As described hereinabove, the load( ) function is defined in the client-specific layer 192 as a derived class member for a particular client. The loaded data is mapped into the problem space for the industry-specific layer 191 and generic layer 190 (block 211). This mapping is accomplished through inheritance whereby the parent and grandparent classes, that is, the industry-specific layer 191 derived abstract classes and generic layer 190 abstract class, instantiate client-specific objects to industry-specific and finally generic objects. Generic marginal values are then determined using the generic solve( ) function, such as shown in the perishable RMP class 194 (block 212) as further described hereinbelow in FIG. 19. The generic marginal values are mapped back into the client-specific problem space, that is, to the particular client-specific layer 192 class (block 213). Finally, the marginal values as mapped from generic marginal values to client-specific marginal values are stored using the store( ) function contained in the client-specific layer 192 class (block 214).

Figure 23:
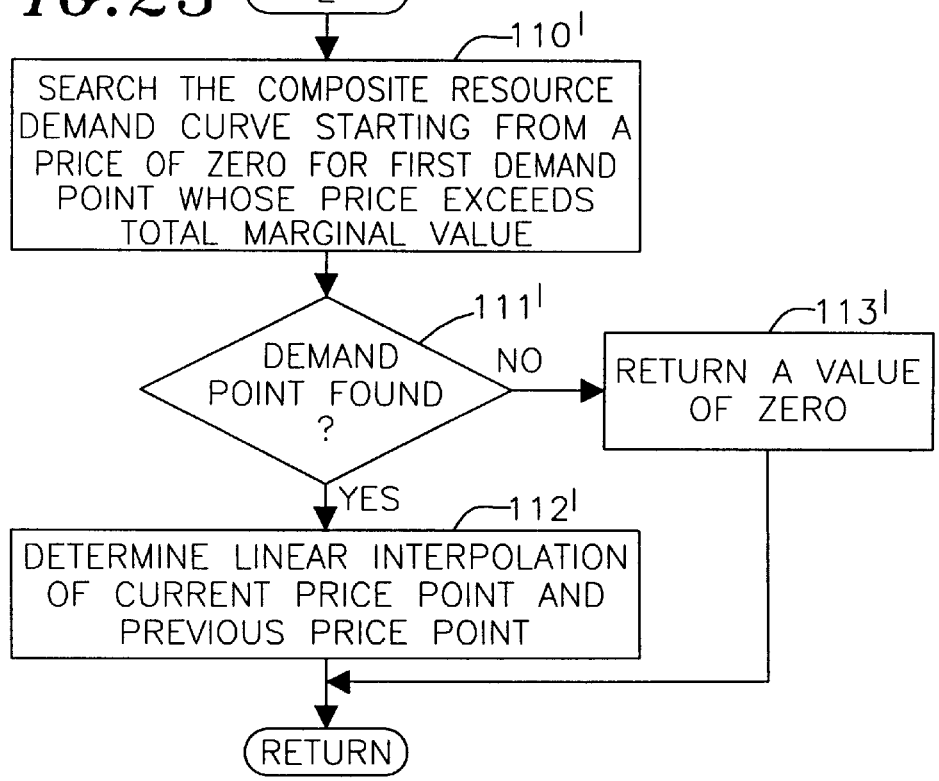
FIG. 23 is a flow diagram of a composite resource demand search function.
Figure 24:
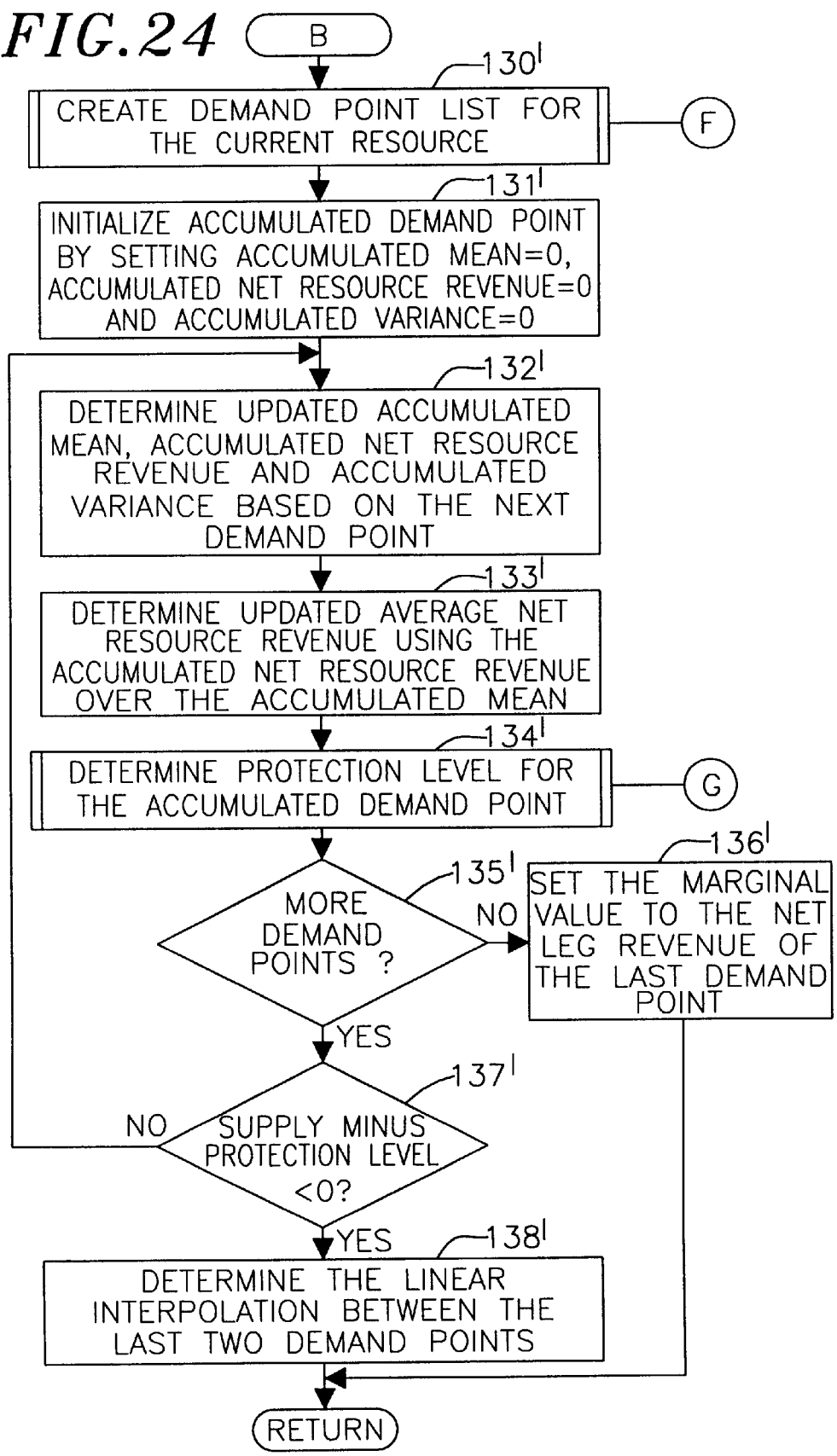
FIG. 24 is a flow diagram of a non-deterministic optimization function used by the function of FIG. 19.
Figure 25:
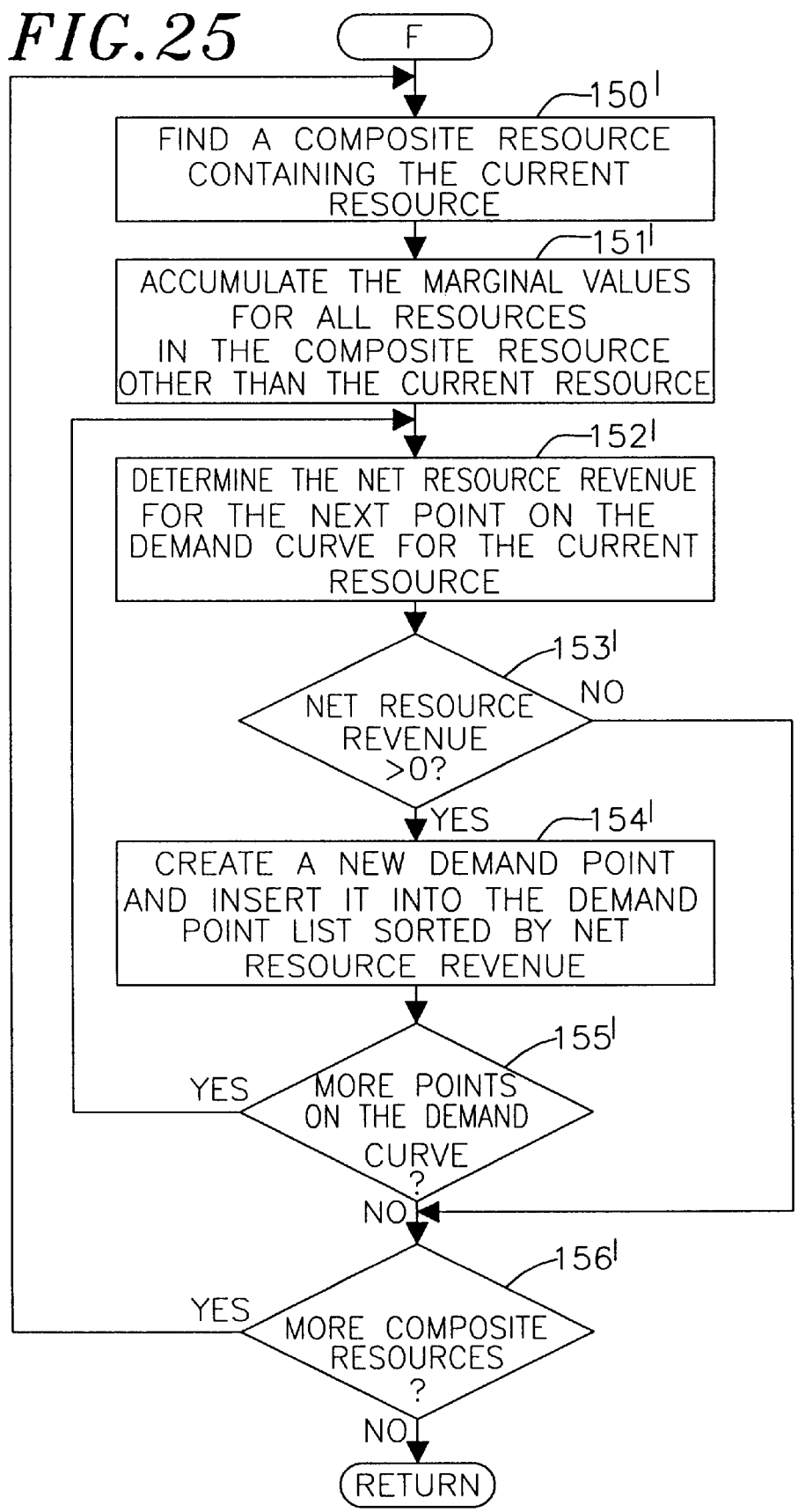
FIG. 25 is a flow diagram of a demand point list creation function.
Figure 26:
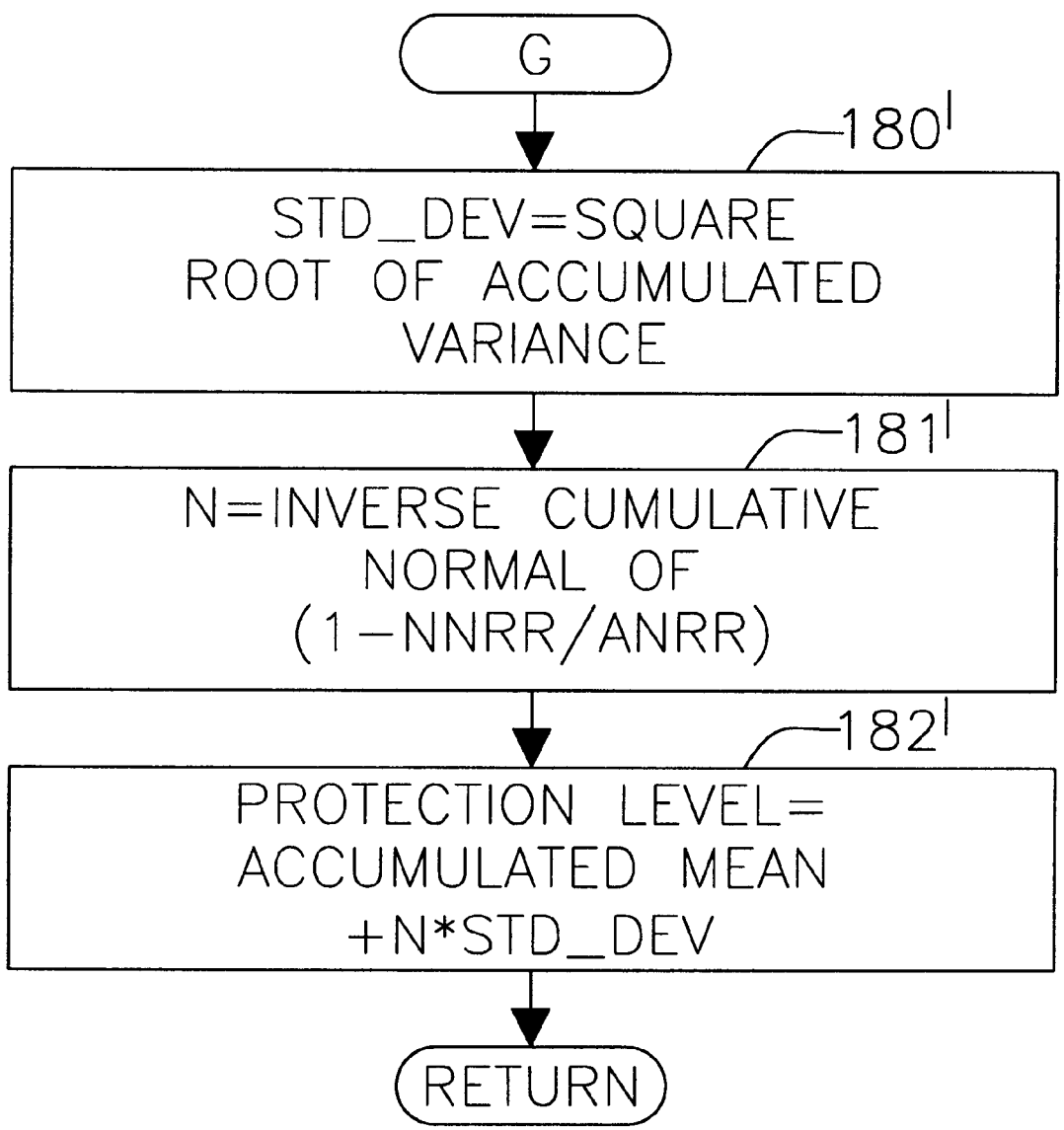
FIG. 26 is a flow diagram of a protection level determination function.

FIGS. 19–26 are flow diagrams of an iterative function for determining generic marginal values for use in a perishable resource management system. The operations described in these figures are the same as those previously described for an airline-specific implementation, although the two implementations operate in different problem spaces. In particular, the program variables used by the generic class library 189 are presented in terms of perishable resources rather than seats on flight leg departures. The correlation between the airline-specific functions and the generic class library functions are shown below in Table II. FIGS. 10 and 23 are identical, so there is no entry in Table II for these figures. Note that identical reference numerals are used for the flow diagrams in FIGS. 5–6, 8–10, 12 and 14A–15 as in FIGS. 19–26, respectively, except that an apostrophe sign has been added to the reference numerals in the latter. Therefore, it will be understood that the same portions of the Detailed Description with respect to FIGS. 5–6, 8–10, 12 and 14A–15 (pertaining to the airline-specific method) also apply to FIGS. 19–26 (pertaining to the generic class library method) with exceptions as noted in Table II for program variable names.

TABLE II

| | Airline-Specific | | | Generic Class Library | |
|---|---|---|---|---|---|
| FIG. | Block | Variable Name | FIG | Block | Variable Name |
| 5 | 60 | flight leg departures | 19 | 60' | resources |
| | 62 | seat on one of the flight leg departures | | 62' | resources |
| | 66 | flight leg departure | | 66' | resource |
| 6 | 70 | flight leg departure | 20 | 70' | resource |
| | 71 | flight leg departure | | 70' | resource |
| 8 | 90 | flight leg departure | 21 | 90' | resource |
| | 91 | flight path departure flight leg departure | | 91' | composite resource resource |
| | 92 | flight path departure flight leg departure | | 92' | composite resource resource |
| | 93 | flight path departures | | 93' | composite resources |
| 9 | 100 | flight path departure | 22 | 100' | composite resource |
| | 101 | flight leg departures flight path departure | | 101' | resources composite resource |
| | 102 | flight leg departures | | 102' | resources |
| | 103 | flight path departure | | 103' | composite resource |
| 12 | 130 | flight leg departure | 24 | 130' | resource |
| 14A | 150 | flight path departure flight leg departure | 25 | 150' | composite resource resource |
| | 151 | flight leg departures flight path departure flight leg departure | | 151' | resources composite resource resource |
| | 152 | net leg revenue flight path departure | | 152' | net resource revenue composite resource |
| | 154 | net leg revenue | | 154' | net resource revenue |
| | 156 | flight path departure | | 156' | composite resources |
| 15 | 182 | average net leg revenue ANLR | 26 | 182' | average net resource revenue ANRR |
| | 183 | net leg revenue NLR | | 183' | net resource revenue NRR |
| 15 | 184 | NLR ANLR | | 184 | NRR ANRR |

While various embodiments of the invention have been particularly shown, it will be understood by those skilled in the art that the various changes in form and detail may be made without departing from the scope and spirit of the present invention, wherein:

What is claimed is:

1. A method using a computer for determining marginal values for perishable resources, comprising the steps of:

loading data for the perishable resources and composite resources from a perishable resource revenue management system into the marginal value system;

constructing internal data structures for linking each of the perishable resources to their associated composite resources and for linking each of the composite resources to their associated perishable resources;

determining the marginal values for the perishable resources using a continuous optimization function using interdependencies among the perishable resources and the composite resources in the internal data structures; and storing the marginal values from the marginal value system into the perishable resource revenue management system.

2. A method according to claim 1, the step of determining further comprising the steps of:

evaluating a locally optimal marginal value for the perishable resources using the continuous optimization function on each of the perishable resources; and performing the step of evaluating in successive iterations until a globally optimal marginal value is evaluated for the perishable resources based on a convergence criterion.

3. A method according to claim 2, further comprising the steps of:

monitoring a maximum difference between such locally optimal marginal values evaluated during a current iteration and such locally optimal marginal values evaluated during a previous iteration;

comparing the maximum difference and the convergence criterion upon completion of the current iteration whereby convergence is satisfied when the maximum difference is less than the convergence criterion.

4. A method according to claim 1, the step of determining further comprising the steps of:

evaluating a locally optimal marginal value for one of the perishable resources using the continuous optimization function; and performing the step of evaluating in successive iterations for another of the perishable resources until a locally optimal marginal value has been evaluated for all of the perishable resources.

5. A method according to claim 4, further comprising the steps of:

determining the absolute difference between such locally optimal marginal value evaluated for one of the perishable resources during a current iteration and such locally optimal marginal value evaluated for the resource during a previous iteration;

comparing the absolute difference to a maximum difference between such locally optimal marginal value evaluated for another of the perishable resources during the current iteration and such locally optimal marginal value evaluated for the resource during the previous iteration whereby the maximum difference equals or exceeds all such absolute differences between such locally optimal marginal values evaluated for all other perishable resources during a current iteration and such locally optimal marginal values evaluated for the resources during a previous iteration; and replacing the maximum difference with the absolute difference when the absolute difference is greater than the maximum difference.

6. A method according to claim 1, further comprising the steps of:

loading resource value data comprising a supply of the perishable resources and a set of resource prices from the perishable resource revenue management system into the marginal value system; and constructing an internal data structure for linking each of the composite resources to their associated set of resource prices and for linking each of the perishable resources to their associated supply.

7. A method according to claim 6, whereby the continuous optimization function is a deterministic optimization function, the step of determining further comprising evaluating locally optimal marginal values based on a certain demand for each of the composite resources.

8. A method according to claim 7, whereby the deterministic optimization function is a supply-demand balance optimization function, further comprising the step of:

searching for a marginal value for one of the composite resources whereby the supply substantially equals the demand for the one composite resource.

9. A method according to claim 8, further comprising the steps of:

determining the difference between the supply and the certain demand for the one resource; and setting the marginal value for the one resource to indicate that the supply exceeds the demand when the difference is positive.

10. A method according to claim 8, further comprising the step of:

determining the certain demand for the one perishable resource based on the marginal values for each other of the perishable resources contained in each of the composite resources containing the one perishable resource.

11. A method according to claim 10, further comprising the steps of:

determining a composite resource demand for each of the composite resources containing the one perishable resource; and adding the composite resource demand for each of the composite resources to the certain demand for the one perishable resource.

12. A method according to claim 11, further comprising the steps of:

adding the marginal value for each of the perishable resources contained in one of the composite resources to a total marginal value; and determining the composite resource demand for the one composite resource using the total marginal value.

13. A method according to claim 12, whereby each of the set of resource prices comprises a corresponding demand point on a demand curve, further comprising the steps of:

searching for the first demand point on the demand curve corresponding to a resource price that exceeds the total marginal value;

determining a linear average between the first demand point and a second demand point previous to the first demand point; and determining the composite resource demand based on an intersection of the supply and the linear average.

14. A method according to claim 6, whereby the continuous optimization function is a non-deterministic optimization function, the step of determining further comprising evaluating locally optimal marginal values based on an uncertain demand for each of the composite resources.

15. A method according to claim 14, whereby the continuous optimization function is a non-deterministic optimization function based on a supply of each of the perishable resources and an uncertain demand for the composite resources.

16. A method according to claim 15, whereby the non-deterministic optimization function is an expected marginal resource revenue (EMRR) optimization function, further comprising the steps of:

搜索 searching for a marginal value for one of the composite resources whereby the supply substantially matches a protection level for the one composite resource.

17. A method according to claim 16, further comprising the step of:

loading resource value data further comprising a set of means and a set of variances from the perishable resource revenue management system into the marginal value system whereby the set of means and the set of variances correspond to the set of resource prices; and constructing an internal data structure for linking each of the composite resources to their associated set of means and set of variances.

18. A method according to claim 16, further comprising the steps of:

creating a demand point list for the one perishable resource containing a set of demand points corresponding to each of the set of resource prices;

determining an accumulated mean, an accumulated net leg revenue and an accumulated variance based on the set of resource prices, the set of means and the set of variances for each demand point in the demand point list;

determining an updated average net resource revenue based on the accumulated net leg revenue and the accumulated mean; and determining the protection level for each of a set of accumulated demand points using the accumulated mean, the accumulated variance and the average net leg revenue for each demand point in the demand point list.

19. A method according to claim 18, whereby the demand point list is determined, further comprising the steps of:

accumulating the marginal values for all of the perishable resources in a composite resource containing the one perishable resource except for the marginal value for the one composite resource for each of the set of resource prices;

determining a net leg revenue for each demand point in the demand point list using the accumulated marginal values; and creating a new demand point when the net leg revenue is positive.

20. A method according to claim 19, further comprising the steps of:

setting the net leg revenue to the difference of the corresponding resource price minus the accumulated marginal values.

21. A method according to claim 18, further comprising the steps of:

determining the accumulated mean comprising a summation of each mean in the set of means for each of the set of demand points;

determining the accumulated net leg revenue comprising a summation of each of the set of resource prices multiplied by each of the means in the set of means for each of the set of demand points; and determining the accumulated variance comprising a summation of each variance in the set of variances for each of the set of demand points.

22. A method according to claim 18, further comprising the steps of:

determining the updated average net resource comprising the quotient of the accumulated net leg revenue divided by the accumulated mean.

23. A method according to claim 18, further comprising the steps of:

determining a standard deviation equaling a square root of the accumulated variance;

determining an inverse cumulative normal of the equation:

$$(1-NNRR/ANRR)$$

whereby NNRR corresponds to next net resource revenue for a demand point in the demand point list and ANRR corresponds to the average net resource revenue for each demand point in the demand point list; and setting the protection level to the sum of the accumulated mean plus the inverse cumulative normal multiplied by the standard deviation.

24. A computerized marginal value system for determining marginal values for perishable resources, comprising:

means for loading data for the perishable resources and composite resources from a computerized perishable resource revenue management system into the computerized marginal value system;

means for constructing internal data structures for linking each of the perishable resources to their associated composite resources and for linking each of the composite resources to their associated perishable resources;

means for determining the marginal values for the perishable resources using a continuous optimization function using the perishable resources and the composite resources in the internal data structures; and means for storing the marginal values from the marginal value system into the perishable resource revenue management system.

25. A method of producing a marginal value representing currency determined using a computerized marginal value system for use in a computerized perishable resource revenue management system for granting and denying a sale of one or more perishable resources expiring at a future time depending on marginal values for each of such perishable resources received from the computerized perishable resource revenue management system, comprising the steps of:

loading data for the perishable resources, composite resources and a resource value from a computerized perishable resource revenue management system into the computerized marginal value system;

constructing internal data structures for the perishable resources, composite resources and resource value;

determining marginal values for the perishable resources using a continuous optimization function; and storing the marginal values from the computerized marginal value system into the computerized perishable resource revenue management system.

26. A method using a computer for determining marginal values for perishable resources, comprising the steps of using the computer for:

loading data for the perishable resources and composite resources from a perishable resource revenue management system into the marginal value system;

constructing internal data structures for linking each of the perishable resources to their associated composite resources and for linking each of the composite resources to their associated perishable resources;

evaluating a locally optimal marginal value for one of the perishable resources using a continuous optimization function dependent on the marginal values for the other perishable resources; and iteratively reevaluating the locally optimal marginal value until a globally optimal marginal value is attained for the one of the perishable resources.

27. A method according to claim 26, further comprising the steps of:

iteratively performing the step of evaluating until a locally optimal marginal value is attained for each of the perishable resources.

28. A method according to claim 26, whereby the continuous optimization function is a supply demand balance optimization function, further comprising the steps of:

determining whether a supply for the one perishable resource minus a demand for the one perishable resource is positive; and searching for the locally optimal marginal value that makes the supply equal the demand.

29. A method according to claim 26, whereby the continuous optimization function is a expected marginal resource revenue optimization function, further comprising the steps of:

creating a demand point list for the one perishable resource based on a set of resource prices, means and variances associated with each of the composite resources containing the one perishable resource;

determining a protection level for each demand point in the demand point list; and searching for the locally optimal marginal value that makes the supply equal the protection level.

30. A marginal value system for determining marginal values for perishable resources, comprising:

computerized means for evaluating a locally optimal marginal value for one of the perishable resources using a continuous optimization function dependent on the marginal values for the other perishable resources; and computerized means for iteratively reevaluating the locally optimal marginal value until a globally optimal marginal value is attained for the one of the perishable resources.

31. A method using a computer for determining marginal values for seats on flight leg departures departing on a future departure date, comprising the steps of:

loading data for flight leg departures and flight path departures from an airline revenue management system into a marginal value system;

constructing internal data structures for linking each of the flight leg departures to their associated flight path departures and for linking each of the flight path departures to their associated flight leg departures;

determining the marginal values for seats on the flight leg departures using a continuous optimization function using interdependencies among the flight leg departures and the flight path departures in the internal data structures; and storing the marginal values from the marginal value system into the airline revenue management system.

32. A method according to claim 31, the step of determining further comprising the steps of:

evaluating a locally optimal marginal value for seats on the flight leg departures using the continuous optimization function on each of the flight leg departures; and performing the step of evaluating in successive iterations until a globally optimal marginal value is evaluated for the flight leg departures based on a convergence criterion.

33. A method according to claim 32, further comprising the steps of:

monitoring a maximum difference between such locally optimal marginal values evaluated during a current iteration and such locally optimal marginal values evaluated during a previous iteration;

comparing the maximum difference and the convergence criterion upon completion of the current iteration whereby convergence is satisfied when the maximum difference is less than the convergence criterion.

34. A method according to claim 31, the step of determining further comprising the steps of:

evaluating a locally optimal marginal value for a seat on one of the flight leg departures using the continuous optimization function; and performing the step of evaluating in successive iterations for another of the flight leg departures until a locally optimal marginal value has been evaluated for all of the flight leg departures.

35. A method according to claim 34, further comprising the steps of:

determining the absolute difference between such locally optimal marginal value evaluated for a seat on one of the flight leg departures during a current iteration and such locally optimal marginal value evaluated for the seat during a previous iteration;

comparing the absolute difference to a maximum difference between such locally optimal marginal value evaluated for a seat on another of the flight leg departures during the current iteration and such locally optimal marginal value evaluated for the seat during the previous iteration whereby the maximum difference equals or exceeds all such absolute differences between such locally optimal marginal values evaluated for seats on all other flight leg departures during a current iteration and such locally optimal marginal values evaluated for the seats during a previous iteration; and replacing the maximum difference with the absolute difference when the absolute difference is greater than the maximum difference.

36. A method according to claim 31, further comprising the steps of:

loading passenger value data comprising a supply of seats on each of the flight leg departures and a set of booking class prices from the airline revenue management system into the marginal value system; and constructing an internal data structure for linking each of the flight path departures to their associated set of booking class prices and for linking each of the flight leg departures to their associated supply of seats.

37. A method according to claim 36, whereby the continuous optimization function is a deterministic optimization function, the step of determining further comprising evaluating locally optimal marginal values based on a certain demand for seats on each of the flight leg departures.

38. A method according to claim 37, whereby the deterministic optimization function is a supply-demand balance optimization function, further comprising the step of:

searching for a marginal value for one of the flight leg departures whereby the supply of seats substantially matches the demand for seats on the one flight leg departure.

39. A method according to claim 38, further comprising the steps of:

determining the difference between the supply of seats and the certain demand for seats on the one flight leg departure; and setting the marginal value for the one flight leg departure to indicate that the supply of seats exceeds the demand for seats when the difference is positive.

40. A method according to claim 38, further comprising the step of:

determining the certain demand for the one flight leg departure based on the marginal values for each other of the flight leg departures contained in each of the flight path departures containing the one flight leg departure.

41. A method according to claim 40, further comprising the steps of:

determining a path demand for each of the flight path departures containing the one flight leg departure; and adding the path demand for each of the flight path departures to the certain demand for the one flight leg departure.

42. A method according to claim 41, further comprising the steps of:

adding the marginal value for each of the flight leg departures contained in one of the flight path departures to a total marginal value; and determining the path demand for the one flight path departure using the total marginal value.

43. A method according to claim 42, whereby each of the set of booking class prices comprises a corresponding demand point on a demand curve, further comprising the steps of:

searching for the first demand point on the demand curve corresponding to a booking class price that exceeds the total marginal value;

determining a linear average between the first demand point and a second demand point previous to the first demand point; and determining the path demand based on an intersection of the supply of seats and the linear average.

44. A method according to claim 36, whereby the continuous optimization function is a non-deterministic optimization function, the step of determining further comprising evaluating locally optimal marginal values based on an uncertain demand for seats on each of the flight leg departures.

45. A method according to claim 44, whereby the continuous optimization function is a non-deterministic optimization function based on a supply of seats on each of the flight leg departures and an uncertain demand for the seats.

46. A method according to claim 45, whereby the non-deterministic optimization function is an expected marginal seat revenue (EMSR) optimization function, further comprising the steps of:

searching for a marginal value for one of the flight leg departures whereby the supply of seats substantially matches a protection level for seats on the one flight leg departure.

47. A method according to claim 46, further comprising the step of:

loading passenger value data further comprising a set of means and a set of variances from the airline revenue management system into the marginal value system whereby the set of means and the set of variances correspond to the set of booking class prices; and constructing an internal data structure for linking each of the flight path departures to their associated set of means and set of variances.

48. A method according to claim 46, further comprising the steps of:

creating a demand point list for the one flight leg departure containing a set of demand points corresponding to each of the set of booking class prices;

determining an accumulated mean, an accumulated net leg revenue and an accumulated variance based on the set of booking class prices, the set of means and the set of variances for each demand point in the demand point list;

determining an updated average net leg revenue based on the accumulated net leg revenue and the accumulated mean; and determining the protection level for each of a set of accumulated demand points using the accumulated mean, the accumulated variance and the average net leg revenue for each demand point in the demand point list.

49. A method according to claim 48, whereby the demand point list is determined, further comprising the steps of:

accumulating the marginal values for all of the flight leg departures in a flight path departure containing the one flight leg departure except for the marginal value for the one flight leg departure for each of the set of booking class prices;

determining a net leg revenue for each demand point in the demand point list using the accumulated marginal values; and creating a new demand point when the net leg revenue is positive.

50. A method according to claim 49, further comprising the steps of:

setting the net leg revenue to the difference of the corresponding booking class price minus the accumulated marginal values.

51. A method according to claim 48, further comprising the steps of:

determining the accumulated mean comprising a summation of each mean in the set of means for each of the set of demand points;

determining the accumulated net leg revenue comprising a summation of each of the set of booking class prices multiplied by each of the means in the set of means for each of the set of demand points; and determining the accumulated variance comprising a summation of each variance in the set of variances for each of the set of demand points.

52. A method according to claim 48, further comprising the steps of:

determining the updated average net leg comprising the quotient of the accumulated net leg revenue divided by the accumulated mean.

53. A method according to claim 48, further comprising the steps of:

determining a standard deviation equalling a square root of the accumulated variance;

determining an inverse cumulative normal of the equation:

(1−NNLR/ANLR)

whereby NNLR corresponds to a next net leg revenue for a demand point in the demand point list and ANLR corresponds to the average net leg revenue for each demand point in the demand point list; and setting the protection level to the sum of the accumulated mean plus the inverse cumulative normal multiplied by the standard deviation.

54. A computerized marginal value system for determining marginal values for seats on flight leg departures departing on a future departure date comprising:

means for loading data for flight leg departures and flight path departures from a computerized airline revenue management system into the computerized marginal value system;

means for constructing internal data structures for linking each of the flight leg departures to their associated flight path departures and for linking each of the flight path departures to their associated flight leg departures;

means for determining the marginal values for seats on the flight leg departures using a continuous optimization function using the flight leg departures and the flight path departures in the internal data structures; and means for storing the marginal values from the marginal value system into the computerized airline revenue management system.

55. A method of producing a marginal value representing currency determined using a computerized marginal value system for use in conjunction with an airline reservations system for granting and denying a sale of seats on one or more flight leg departures departing on a future departure date depending on marginal values for seats on each of such flight leg departures received from a computerized airline revenue management system, the method comprising the steps of:

loading data for flight leg departures, flight path departures and passenger value from the computerized airline revenue management system into the computerized marginal value system;

constructing internal data structures for the flight leg departures, flight path departures and passenger value;

determining marginal values for seats on the flight leg departures using a continuous optimization function; and storing the marginal values from the marginal value system into the computerized airline revenue management system.

56. A method using a computer for determining marginal values for seats on flight leg departures departing on a future departure date, comprising the steps of using the computer for:

loading data for flight leg departures and flight path departures from an airline revenue management system into the marginal value system;

constructing internal data structures for linking each of the flight leg departures to associated flight path departures and for linking each of the flight path departures to their associated flight leg departures;

evaluating a locally optimal marginal value for a seat on one of the flight leg departures using a continuous optimization function dependent on the marginal values for a seat on the other flight leg departures; and iteratively reevaluating the locally optimal marginal value until a globally optimal marginal value is attained for the seat on one of the flight leg departures.

57. A method according to claim 56, further comprising the steps of:

iteratively performing the step of evaluating until a locally optimal marginal value is attained for each of the flight leg departures.

58. A method according to claim 56, whereby the continuous optimization function is a supply demand balance optimization function, further comprising the steps of:

determining whether a supply of seats for the one flight leg departure minus a demand for seats for the one flight leg departure is positive; and searching for the locally optimal marginal value that makes the supply of seats equal the demand for seats.

59. A method according to claim 56, whereby the continuous optimization function is a expected marginal seat revenue optimization function, further comprising the steps of:

creating a demand point list for the one flight leg departure based on a set of booking class prices, means and variances associated with each of the flight path departures containing the one flight leg departure;

determining a protection level for each demand point in the demand point list; and searching for the locally optimal marginal value that makes the supply of seats equal the protection level.

60. A marginal value system for determining marginal values for seats on flight leg departures departing on a future departure date, comprising:

computer means for evaluating a locally optimal marginal value for a seat on one of the flight leg departures using a continuous optimization function dependent on the marginal values for a seat on the other flight leg departures; and computer means for iteratively re-evaluating the locally optimal marginal value until a globally optimal marginal value is attained for the seat on one of the flight leg departures.

* * * * *